(12) United States Patent
Zadeh et al.

(10) Patent No.: US 12,344,348 B2
(45) Date of Patent: Jul. 1, 2025

(54) ELECTRIC VEHICLE WITH SWING ARM FOR INDEPENDENTLY ARTICULATING WHEELS

(71) Applicant: THE BARBARA B. BUZARD DESCENDANTS' TRUST, Milwaukee, WI (US)

(72) Inventors: Allen Zadeh, Summerfield, NC (US); Robert T. Foote, III, New York, NY (US)

(73) Assignee: Barbara B. Buzard Descendants' Trust, Nashotah, WI (US)

( * ) Notice: Subject to any disclaimer, the term of this patent is extended or adjusted under 35 U.S.C. 154(b) by 0 days.

(21) Appl. No.: 18/559,304

(22) PCT Filed: May 12, 2021

(86) PCT No.: PCT/US2021/031901
§ 371 (c)(1),
(2) Date: Nov. 6, 2023

(87) PCT Pub. No.: WO2022/240399
PCT Pub. Date: Nov. 17, 2022

(65) Prior Publication Data
US 2024/0239433 A1    Jul. 18, 2024

(51) Int. Cl.
  *B62K 5/10*    (2013.01)
  *B62K 5/027*   (2013.01)
  *B62K 5/06*    (2006.01)

(52) U.S. Cl.
CPC ............ *B62K 5/10* (2013.01); *B62K 5/027* (2013.01); *B62K 5/06* (2013.01)

(58) Field of Classification Search
CPC . B62K 5/10; B62K 5/027; B62K 5/06; B62K 25/16; B62K 25/20; B62K 5/02; B62M 6/65
See application file for complete search history.

(56) References Cited

U.S. PATENT DOCUMENTS

| 5,611,555 A | * | 3/1997 | Vidal | ............... | B62D 9/02 |
| | | | | | 280/282 |
| 6,104,154 A | | 8/2000 | Harada | | |

(Continued)

FOREIGN PATENT DOCUMENTS

| DE | 102005039122 | 2/2007 |
| EP | 3812255 | 4/2021 |

(Continued)

OTHER PUBLICATIONS

European Search Report for PCT/US2021/031901 dated Jun. 14, 2024; 8 pps.

(Continued)

*Primary Examiner* — Drew J Brown
(74) *Attorney, Agent, or Firm* — RowanTree Law Group, PLLC; Carson C. K. Fincham

(57) ABSTRACT

An electric vehicle (e.g., a tricycle, or a car) includes a frame portion having a first side and a second side. A first rear wheel is disposed rearward relative to the frame portion at the first side. A second rear wheel is disposed rearward relative to the frame portion at the second side, the second rear wheel being spaced from the first rear wheel with a wheel base width therebetween (e.g., in a range from 260 mm to 900 mm). A first swing arm is pivotably coupled to the frame portion at the first side and operably coupled to the first rear wheel and extending between the frame portion and the first rear wheel. A second swing arm pivotably coupled to the frame portion at the second side and operably coupled to the second rear wheel and extending between the frame portion and the second rear wheel.

13 Claims, 25 Drawing Sheets

(56) References Cited

U.S. PATENT DOCUMENTS

| | | | | |
|---|---|---|---|---|
| 7,866,671 | B2* | 1/2011 | Madler | A01D 34/66 |
| | | | | 180/41 |
| 8,419,027 | B2* | 4/2013 | Ting | B62K 5/02 |
| | | | | 280/5.509 |
| 9,090,281 | B2* | 7/2015 | Spahl | B62D 9/04 |
| 9,493,208 | B2* | 11/2016 | Sasaki | B62K 5/027 |
| 10,076,939 | B2* | 9/2018 | Simon | B60G 21/055 |
| 2002/0098933 | A1 | 7/2002 | Kline | |
| 2005/0206101 | A1* | 9/2005 | Bouton | B60G 21/007 |
| | | | | 280/6.154 |
| 2010/0225079 | A1* | 9/2010 | Kwon | B62K 5/10 |
| | | | | 280/64 |
| 2014/0358369 | A1 | 12/2014 | Anderfaas | |

FOREIGN PATENT DOCUMENTS

| | | | | |
|---|---|---|---|---|
| GB | 2450740 A | * | 1/2009 | B60G 21/05 |
| WO | WO 2017076783 | | 5/2017 | |
| WO | 2017137923 | | 8/2017 | |

OTHER PUBLICATIONS

"Tilting, narrow-track, tricycle with rider-controllable tilt rate", University of Wisconsin—Milwaukee, College of Engineering and Applied Science, https://sites.uwm.edu/bike-motorcycle-lab/tilting-narrow-track-recumbent-tricycle/ Apr. 5, 2019; 9 pgs.

International Search Report for International Patent Application No. PCT/US2021/031901 dated Oct. 14, 2021; 4 pgs.

International Written Opinion for International Patent Application No. PCT/US2021/031901 dated Oct. 14, 2021; 15 pgs.

* cited by examiner

ELECTRIC VEHICLE WITH SWING ARM FOR INDEPENDENTLY ARTICULATING WHEELS

FIELD OF THE DISCLOSURE

This disclosure relates to systems and apparatus related to electric vehicle. More particularly, an electric vehicle configured to include a swing arm and/or a dynamic drivetrain that enables the vehicle to lean into turns, while maintaining stability and performance dynamics of the vehicle.

BACKGROUND

Electric vehicles including cars, bicycles and tricycles are quickly becoming part of urban transportation. An advantage of these type of transports is reduced pollution caused by burning fossil fuel. These transportation modes including tricycles may be used for commercial purposes such as for passenger transport, and freight trikes, among others.

As an example, urban delivery tricycles or trikes are designed and constructed for transporting large loads. These trikes include a cargo carrying component such as an open or enclosed box, a flat platform, or a large, heavy-duty wire basket for carrying cargo. The cargo carrying component are usually mounted over one or both wheels at rear of the vehicle. The frame and drivetrain are be constructed to handle loads.

However, the existing tricycles or bikes do not have sufficient maneuverability and stability desired at low and high speeds during turning. Additionally, existing tricycles have wide wheelbase which prevents tricycles from being used in a bike lane, which are typically narrower than a car lane. The size, speed and maneuverability limitations may prevent or limit the use of tricycles in the urban transportation system.

SUMMARY

An electric vehicle configured to include a dynamic drivetrain is discussed herein. The dynamic drivetrain enables improved maneuverability at high speeds and stability at low speeds compared to other comparable vehicles. In some embodiment, the drivetrain may be operably connected with rear wheels of an electric vehicle such as a tricycle or a car. For example, the drivetrain when coupled between a pedal and two rear wheels of a tricycle that enables benefits of both the bicycle and tricycle formats while overcoming their individual disadvantages. The drivetrain herein dramatically improves handling and performance characteristics of the electric vehicle.

For example, when the drivetrain is implemented in a tricycle, the drivetrain creates a bicycle-like handling and ride feel. The drivetrain enables transferring pedal power from a bottom bracket gearbox of a tricycle through the drivetrain to twin rear drive wheels that can be independently powered by the pedal action. The present disclosure incorporates a mechanical system that allows the electric vehicle such as a tricycle to lean (rock or bank) both left and right, to achieve bicycle-like performance when riding at elevated speeds. This system lets the tricycle physically angle against the ground, counteracting the centrifugal force of a high-speed tight turn. It does this while maintaining pedal power engaged to the rear twin wheels at all times through the lean.

An aspect of this disclosure provides an electric vehicle includes: a frame portion having a first side and a second side; a first rear wheel disposed rearward relative to the frame portion at the first side; a second rear wheel disposed rearward relative to the frame portion at the second side, the second rear wheel being spaced from the first rear wheel with a wheel base width therebetween being in a range from 260 mm to 900 mm; a first swing arm extending between the frame portion and the first rear wheel, the first swing arm pivotably coupled to the frame portion at the first side and operably coupled to the first rear wheel; and a second swing arm extending between the frame portion and the second rear wheel, the second swing arm pivotably coupled to the frame portion at the second side and operably coupled to the second rear wheel.

In an embodiment, the first swing arm wherein the first swing arm and the second swing arm each having a length in a range from 250 mm to 600 mm. In an embodiment, the first swing arm is configured to move the first rear wheel independently of the second rear wheel, and the second swing arm is configured to move the second rear wheel independently of the first rear wheel.

In an aspect of this disclosure, an electric vehicle includes: a frame portion having a first side and a second side; a first rear wheel disposed rearward relative to the frame portion at the first side; a second rear wheel disposed rearward relative to the frame portion at the second side; a first swing arm having an elongated shape with a first end and a second end, wherein the first end of the first swing arm is pivotably coupled to the first side of the frame portion, and the second end of the first swing arm is operably coupled to the first rear wheel, the first swing arm being articulated to cause the first rear wheel to move independently of the second rear wheel; and a second swing arm having an elongated shape with a first end and a second end, wherein the first end of the second swing arm is pivotably coupled to the first side of the frame portion and the second end of the second swing arm is operably coupled to the second rear wheel, the second swing arm being articulated to cause the second rear wheel to move independently of the first rear wheel.

In an embodiment, the electric vehicle further includes a drivetrain. The drivetrain includes an axel having a first end and a second end and extending between the first swing arm and the second swing arm; a first drive mechanism housed by the first swing arm and configured to transmit motion between the axel and the first rear wheel; and a second drive mechanism housed by the second swing arm and configured to transmit motion between the axel and the second rear wheel.

In an aspect of this disclosure, an electric vehicle includes: a frame portion having a first side and a second side with a channel therebetween; a first rear wheel disposed rearward relative to the frame portion at the first side; a second rear wheel disposed rearward relative to the frame portion at the second side; a tilt control motor coupled to the channel of the frame portion; and a tilt blade having a first end and a second end, and extending along a longitudinal axis perpendicular to axis of rotation of the tilt control motor, the tilt blade being coupled to the tilt control motor, the tilt control motor controlling an amount of tilt of the tilt blade in an up direction or a down direction. The first end of the tilt blade is operably coupled to the first rear wheel, and the second end of the tilt blade is operably coupled to the second rear wheel. The first rear wheel and the second rear wheel is configured to move in the up direction or the down direction based on the amount of tilt.

In an embodiment, the electric vehicle further includes a first tie rod connected to the first end of the tilt blade to transmit tilting motion to the first rear wheel; and a second tie rod connected to the second end of the tilt blade to transmit tilting motion to the second rear wheel.

In an aspect of this disclosure, an electric vehicle includes a frame portion having a first side and a second side with a channel therebetween; a first rear wheel disposed rearward relative to the frame portion at the first side; a second rear wheel disposed rearward relative to the frame portion at the second side; a tilt control motor coupled to the channel of the frame portion; and a tilt blade having a first end and a second end, and extending along a longitudinal axis perpendicular to axis of rotation of the tilt control motor. The tilt control motor locks the tilt blade at a particular angle about a pivot point between the tilt control motor and the tilt blade when the speed of the electric vehicle is less than a speed threshold. The first end of the tilt blade is operably coupled to the first rear wheel, and the second end of the tilt blade is operably coupled to the second rear wheel. The first rear wheel and the second rear wheel is configured to move in an up direction or a down direction based on the amount of tilt.

In an aspect of this disclosure, an electric vehicle includes: a frame portion having a first side and a second side with a channel therebetween; a first rear wheel disposed rearward relative to the frame portion at the first side; a second rear wheel disposed rearward relative to the frame portion at the second side; a tilt control motor coupled to the channel of the frame portion; and a tilt blade having a first end and a second end, and extending along a longitudinal axis perpendicular to axis of rotation of the tilt control motor. The tilt control motor is configured to control an amount of tilt of the tilt blade within a 6° range about a pivot point between the tilt control motor and the tilt blade, the amount of tilt balancing a shift in load when a speed of the vehicle is less than a speed threshold. The first end of the tilt blade is operably coupled to the first rear wheel, and the second end of the tilt blade is operably coupled to the second rear wheel. The first rear wheel and the second rear wheel is configured to move in an up direction or a down direction based on the amount of tilt.

In an aspect of this disclosure, an electric vehicle includes a frame portion having a first side and a second side with a channel therebetween; a first rear wheel disposed rearward relative to the frame portion at the first side; a second rear wheel disposed rearward relative to the frame portion at the second side; a tilt control motor coupled to the channel of the frame portion; and a tilt blade having a first end and a second end, and extending along a longitudinal axis perpendicular to axis of rotation of the tilt control motor. The tilt control motor is configured to control an amount of tilt within a 30° range about a pivot point between the tilt control motor and the tilt blade when a speed of the vehicle is greater than a speed threshold, during turning of the vehicle. The first end of the tilt blade is operably coupled to the first rear wheel, and the second end of the tilt blade is operably coupled to the second rear wheel. The first rear wheel and the second rear wheel is configured to move in the up direction or the down direction based on the amount of tilt.

Other aspects and features of the disclosure will become apparent from the following detailed description, the accompanying drawings, and the appended claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1A:
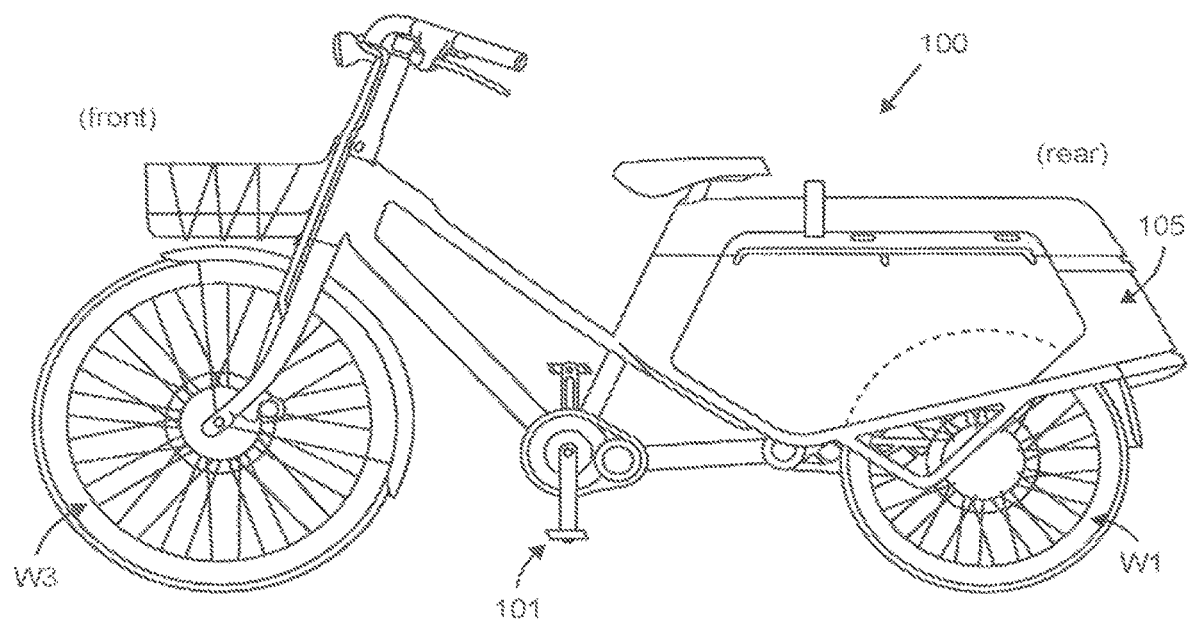
FIGS. 1A and 1B illustrate a side view and a back view of an example electric vehicle such as a tricycle, according to an embodiment.

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed embodiment(s). However, it will be apparent to those skilled in the art that the disclosed embodiment(s) may be practiced without those specific details. In some instances, well-known structures and components may be shown in block diagram form in order to avoid obscuring the concepts of the disclosed subject matter.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It is to be understood that terms such as "left," "right," "top," "bottom," "side," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation, or any requirement that each number must be included.

The present disclosure provides systems or sub-systems configured to be included in a tricycle, a car, or other vehicles having at least two rear wheels or two front wheels. In some embodiments, the vehicle may be manually driven, or electrically driven (e.g., via battery powered motor). In some embodiments, the vehicle may be front wheel drive, or rear wheel drive. According to the present disclosure, example systems include swing arms, dynamic drivetrain, a balance assist lean mechanism, or a combination thereof that may be configured to cooperatively work with other systems of the vehicle.

The system(s) provided herein differentiate and enhance riding experience compared to existing vehicles. In some embodiments, a network of sensors and connected system(s) may be configured to monitor rider's habits, preferences, etc. and accordingly customize vehicle settings to individual needs. Advantages of the present system includes, but not limited to, a contextually aware and intuitive vehicle that reacts in real-time to changing safety conditions, comfort, and performance demands that may be experienced during driving the vehicle or walking with the vehicle.

In an embodiment, referring to FIGS. 1A-1H (also collectively referred as FIG. 1), the vehicle may be a tricycle 100 configured to include systems (or sub-systems) such as a dynamic drivetrain and swing arms. In an embodiment, the drivetrain enables the vehicle to lean into turns while also transferring power from a pedal to rear wheels. In an embodiment, the drivetrain assembly may be created by coupling a gearbox to a drive shaft, a track differential, and a swing arm assembly that together transfers power from the pedals to the rear wheels. The elements of the drivetrain and the swing arm will be discussed in further detail with respect to FIGS. 3, and 4A-4F (also collectively referred as FIG. 4).

The following description discusses the application of the systems herein with respect to a tricycle. However, it can be understood that a person of ordinary skill in the art may configure the systems described herein for other type of vehicles having at least two wheels. For example, the systems herein may be coupled to rear wheels or front wheels (e.g., see FIG. 12). In the present disclosure, examples illustrate implementation with respect to the rear wheels to explain the concepts.

Figure 1B:
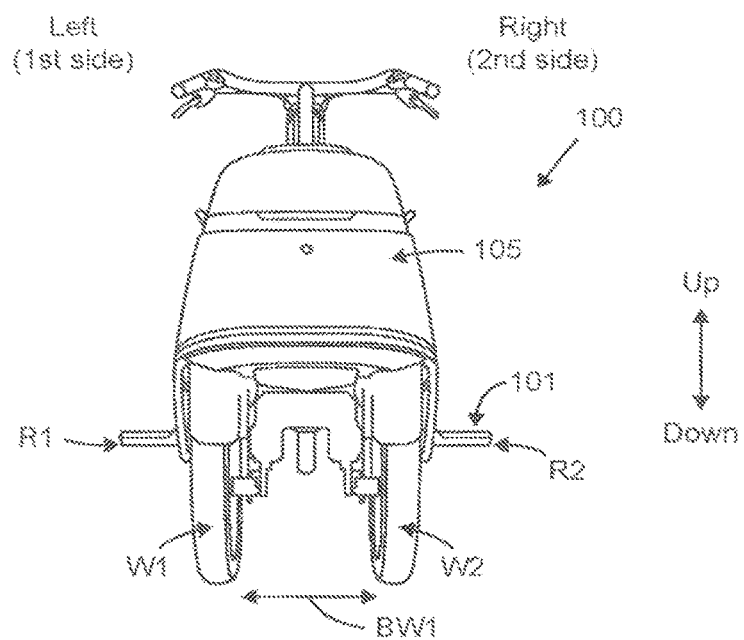

FIGS. 1A and 1B illustrate a side view and a back view of an example electric vehicle such as a tricycle 100. The tricycle 100 includes two rear wheels W1 and W2, a front wheel W3, and a seat located between the front wheel W3 and the rear wheels W1 and W2. In some embodiment, the tricycle 100 may be driven by a pedal 101, a motor (not shown) installed in a wheel hub, or both. As shown, in a level position, the wheels W1 and W2 of the tricycle 100 are coaxially aligned. For example, the wheels W1 and W2 are not positioned in an up or a down direction relative to each other. In some embodiments, depending on their disposition the wheels W1 and W2 may be referred as rear wheels W1 and W2, a first rear wheel W1 and a rear second wheel W2, or a left wheel W1 and a right wheel W2. The axis of rotation of the wheel W1 may be referred as an axis R1 (or a first axis R1) and the axis of rotation of the wheel W2 may be referred as an axis R2 (or a second axis R2).

In some embodiments, the wheels W1 and W2 have a wheelbase width BW1. The wheelbase width BW1 refers to a distance between the wheels W1 and W2. For example, the distance may be between centers of the wheels W1 and W2, or outer edges of the wheels W1 and W2. In some embodiments, the wheelbase width BW1 is in the range 260 mm to 900 mm. In one example, the wheelbase width BW1 may be narrow enough (e.g., in the range 260 mm-500 mm) to allow the tricycle 100 to fit in a bike lane. In some embodiments, the wheelbase width BW1 may be broader (e.g., in the range 500-900) for allowing broader carriage to be installed.

In an embodiment, the different widths of the wheelbase may be determined based on a scale of the vehicle or based on an increased stability provided as the width increases or decreases. In an embodiment, the wheel track width may be designed to be as narrow as possible while still providing adequate stability when lean control is engaged. In an embodiment, the swing arm lengths and wheelbase width is such that it provides the vehicle with both maneuverability and stability. In an embodiment, the swingarm lengths and wheelbase width may be designed to improved stability for carrying a higher payload, while maneuverability may be trade-off for improved stability. As an example, the swing-arm length range may be 250 mm to 600 mm, and the wheel track width range may be 260 mm to 900 mm. In an example, the vehicle may have a swingarm length of 362 mm and a width of 295 mm, a swingarm length in the range 280 mm-340 mm and a wheelbase width in a range 260 mm-295 mm, or a swingarm length in a range 362 mm-460 mm and a wheelbase width in a range 395 mm-900 mm.

Figure 1C:
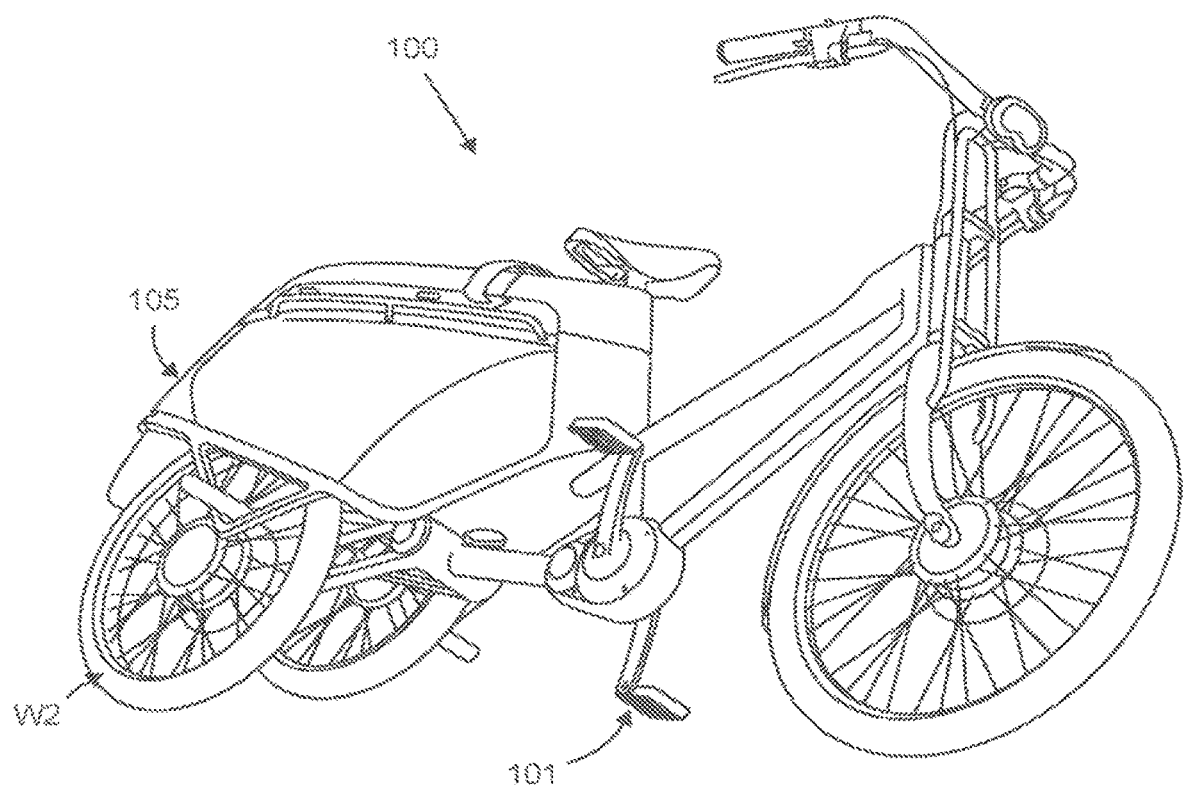
FIG. 1C illustrates a right-side perspective view of the tricycle in a lean position, according to an embodiment.
Figure 1D:
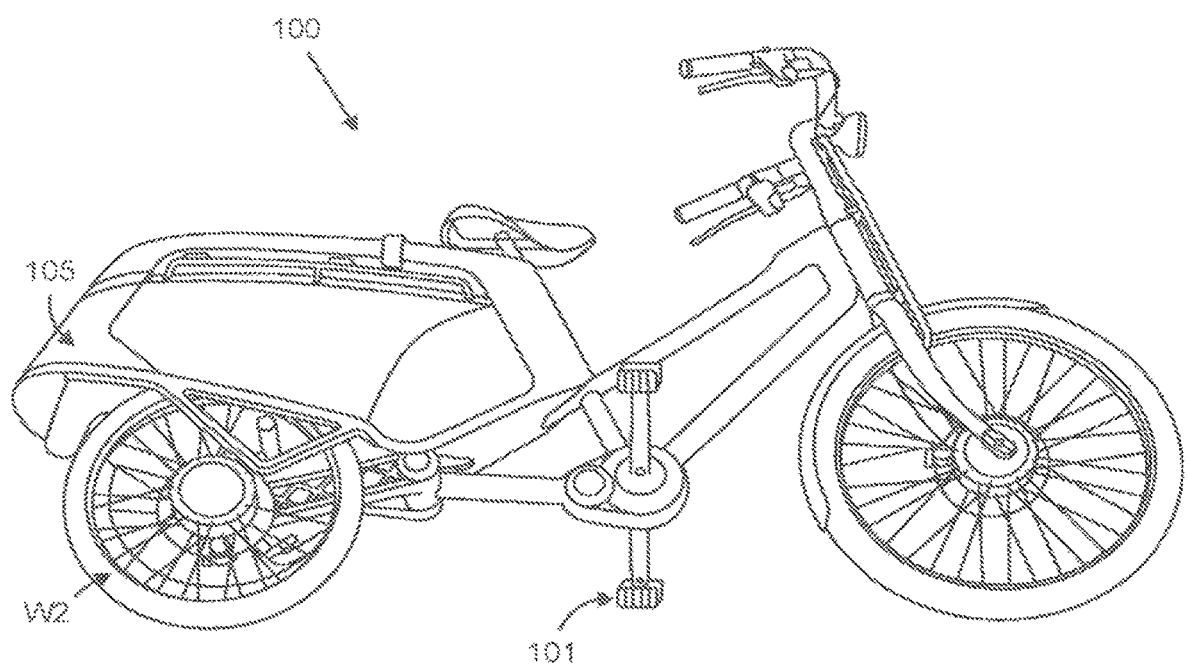
FIG. 1D illustrates a front perspective view of the tricycle in a lean position, according to an embodiment.
Figure 1E:
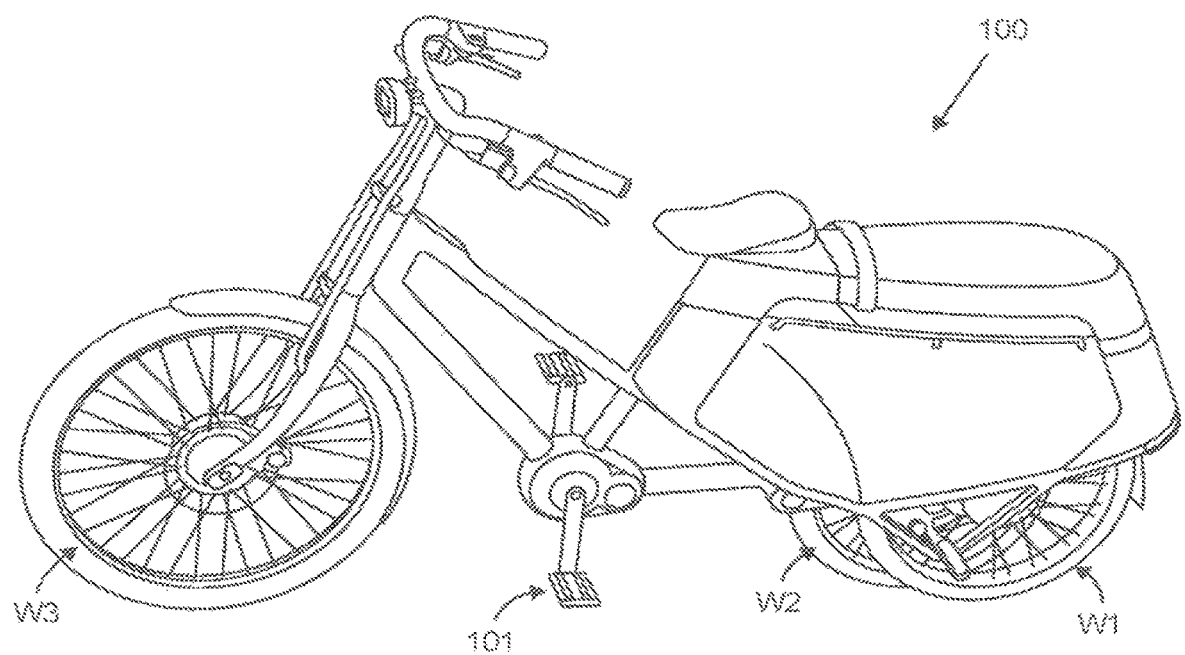
FIGS. 1E and 1F illustrate a left-side perspective view of the tricycle in a lean position, according to an embodiment.
Figure 1F:
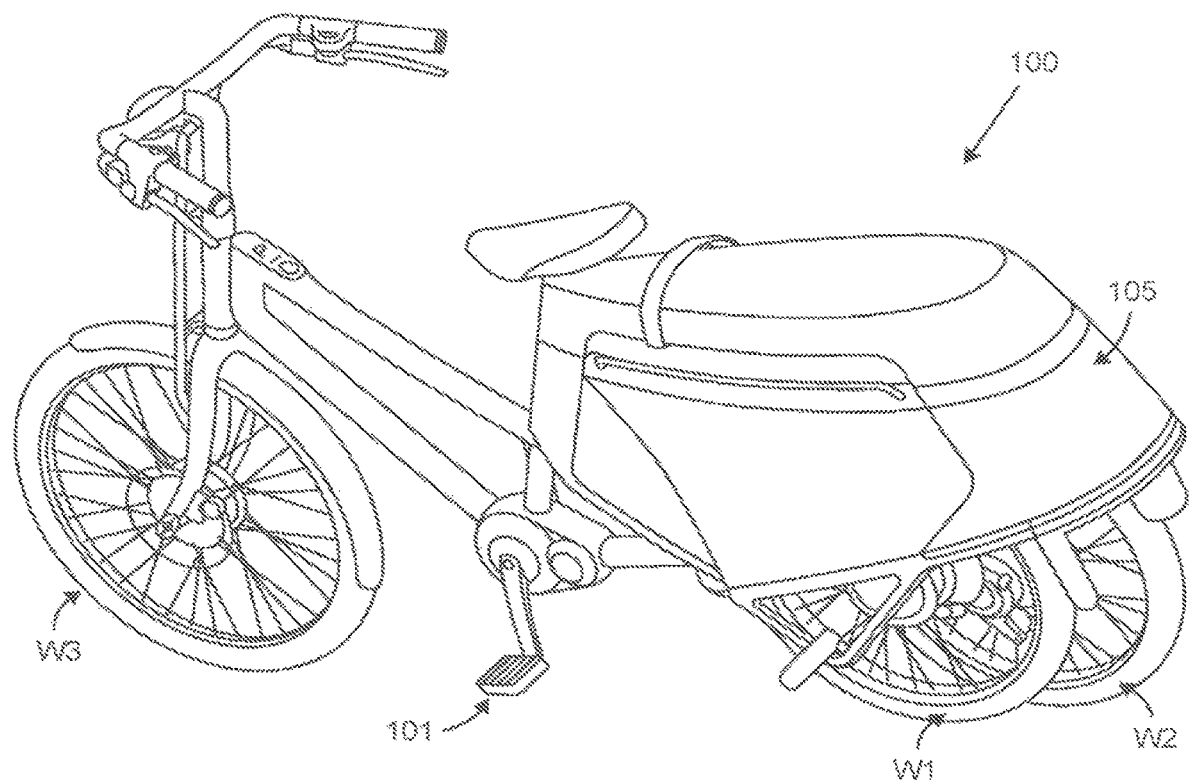

FIGS. 1C, 1D, 1E and 1F illustrate the tricycle 100 in a lean position that is achievable by the systems such as the drivetrain and the swing arms discussed herein. In one example, when the tricycle 100 is taking a left turn, the systems herein cause the tricycle 100 to lean toward left. In one embodiment, the leaning of the tricycle 100 may be characterized with respect to a center of gravity of the tricycle 100 or with respect to the ground. In the left lean position during a left turn, the rear wheels W1 and W2 of the tricycle 100 independently articulate causing the wheels W1 and W2 to move up and down with respect to each other. For example, as shown in FIG. 1C, the wheel W1 is moved relatively upward compared to the wheel W2. Such independent articulation of the wheels W1 and W2 allow the tricycle 100 to turn while keeping the wheels W1 and W2 in contact with the road surface. Due to the independent articulation, the first axis R1 of the wheel W1 may be offset from the second axis R2 of the wheel W2 depending on an unevenness of a driving surface, or a speed of the vehicle.

In some embodiments, the tricycle 100 also includes a carriage or storage compartment 105 located above the wheel hubs of the wheels W1 and W2. The carriage 105 may be used to store or carry items. The storage compartment 105 may be sized to cover the wheelbase width BW1. In an embodiment, the carriage 105 includes a battery compartment configured to store a battery pack, which may be used to power a motor for driving the vehicle. For example, the battery pack may provide power to motors installed in wheel hubs of the rear wheels W1 and W2. In some embodiments, the carriage 105 may be configured to include a space to allow the wheels W1 and W2 to move up or down inside the carriage 105. Typically, the rear wheels of a vehicle are directly mounted on a same axel and rotate on about same axis of rotation.

Figure 1G:
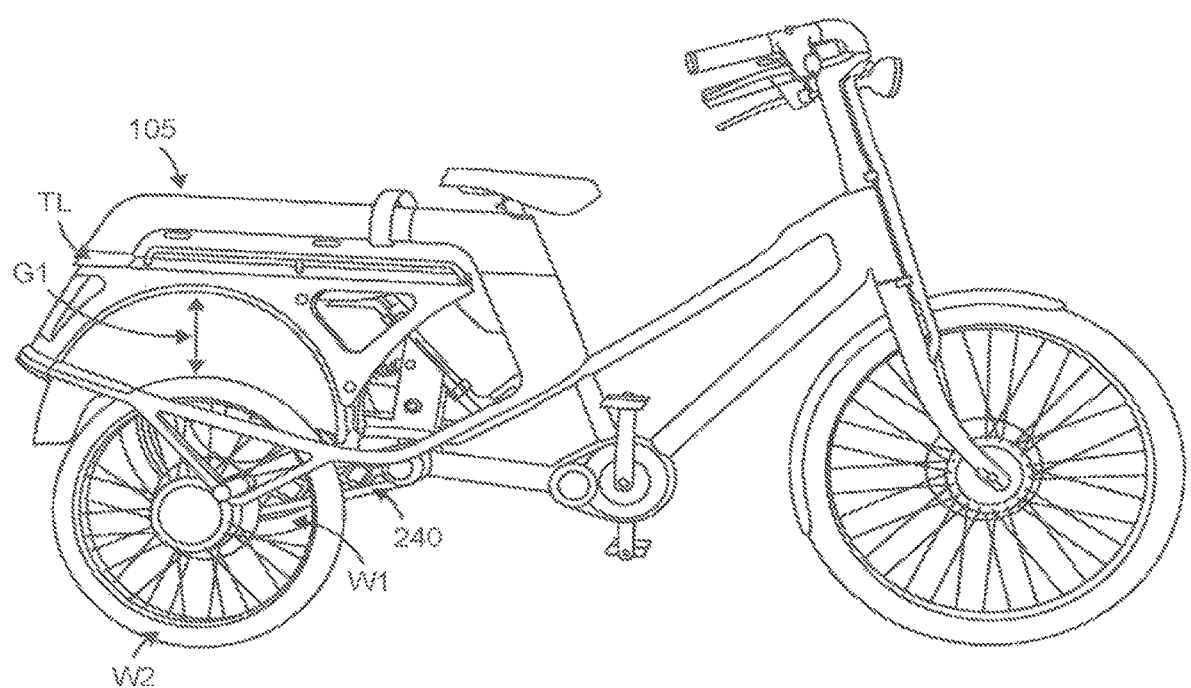
FIGS. 1G and 1H illustrate an exemplary carriage configured to span over the wheels and allow wheels to move relative to the carriage, according to an embodiment.
Figure 1H:
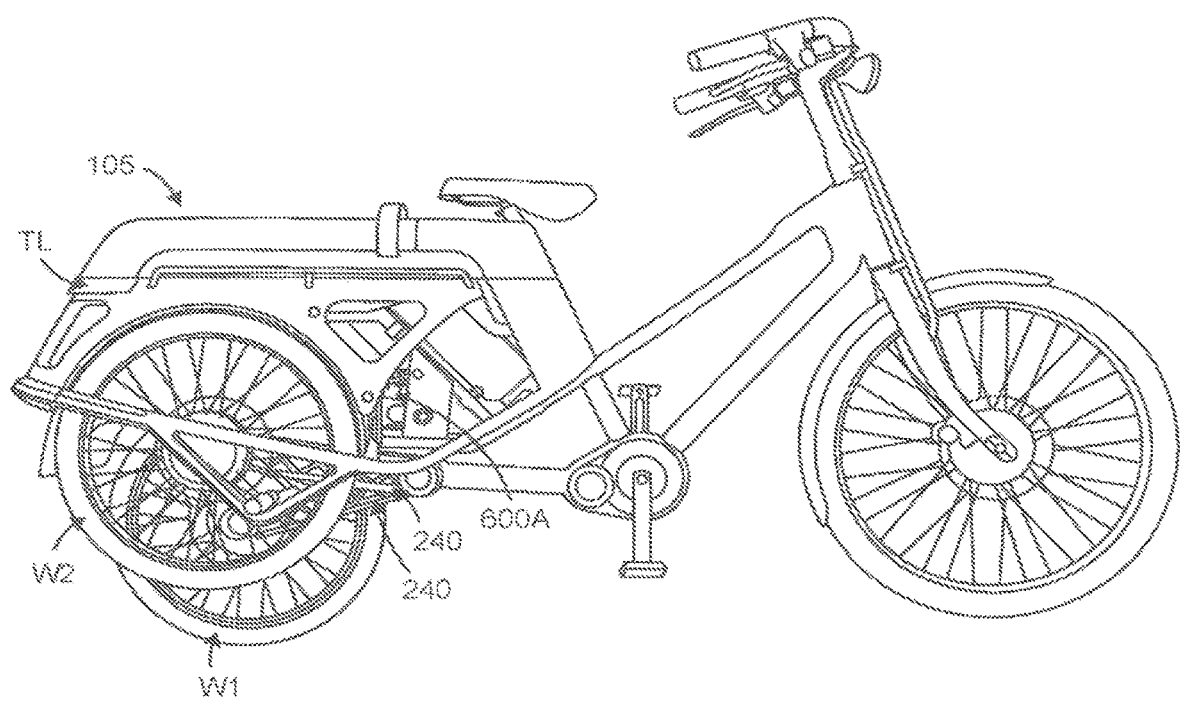

FIGS. 1G and 1H illustrate an exemplary carriage configured to span over the wheels and allow wheels to move relative to the carriage, according to an embodiment. In an embodiment, the carriage 105 is configured to include a space G1 above a tire of the wheel W2 (or W1) to allow the wheel W2 (or W1) to move up and down without contacting the carriage 105. In an embodiment, as the swing arm coupled to the respective wheels moves, the wheel W2 (or W1) may move in up or down direction inside the carriage 105 within the gap G1. FIG. 1G illustrates a level state of the vehicle, exposing the gap G1. FIG. 1H illustrates a tilt or turning state of the vehicle, where the wheel W2 moves inside the carriage 105 within the gap G1. As such, even during a turn or tilting of the vehicle, the carriage 105 and the contents in the carriage will remain substantially levelled irrespective of how the vehicle moves. Such advantageous feature may be desired to provide stability in ride when the vehicle carries a load (e.g., household items, grocery, a kid, etc.). For example, a typical tricycle or bicycle, when leans, may cause the vehicle to become unstable or slip due to load imbalance.

Figure 2:
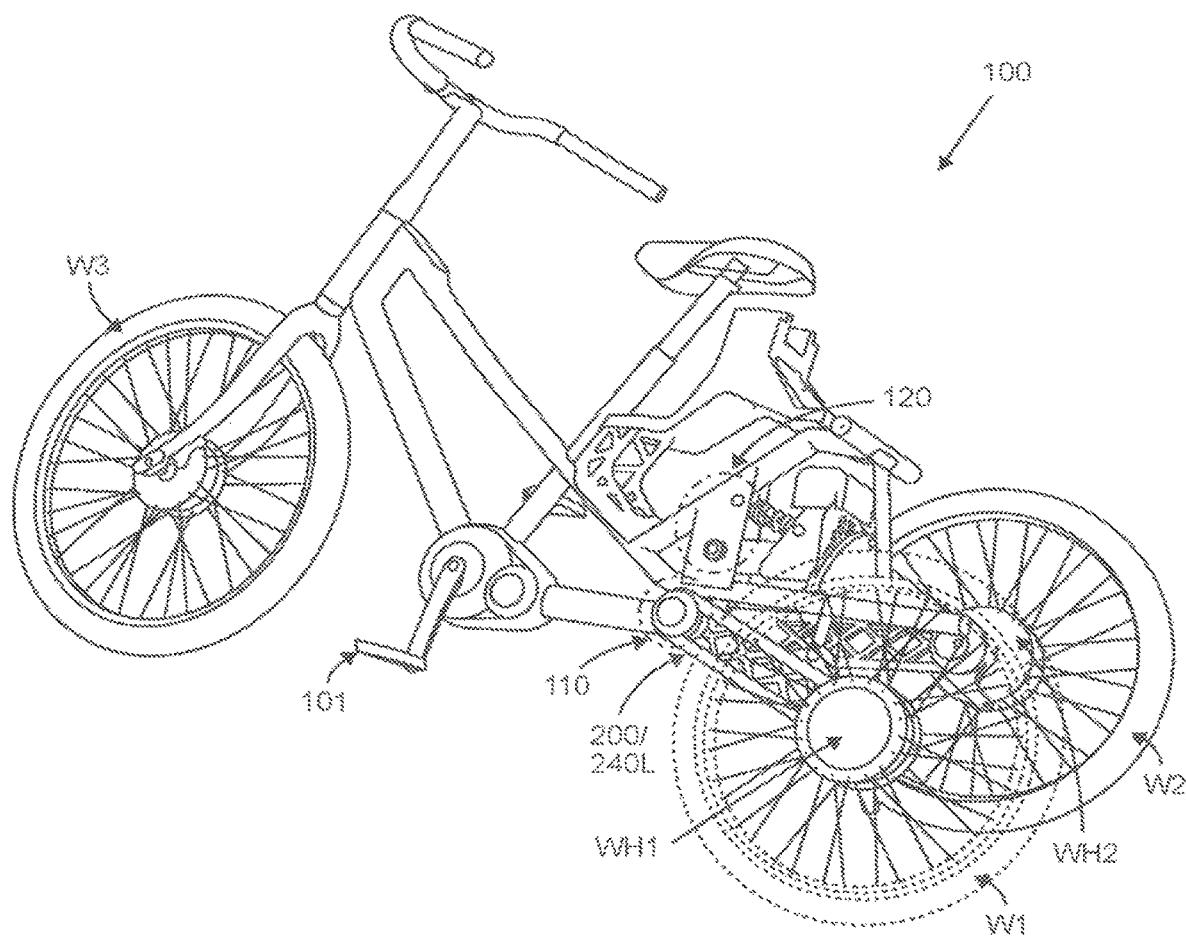
FIG. 2 illustrates a perspective view of the tricycle in another lean position, according to an embodiment.

FIG. 2 illustrates the tricycle 100 when taking a right turn. As shown, the tricycle 100 includes a drivetrain 200 and a swing arm 240L coupled to the wheel W1 and another swing arm coupled to the wheel W2. In some embodiments, as the tricycle 100 leans toward the right, the wheel W2 is caused to move in an upward direction relative to the wheel W1. In one embodiment, the drivetrain 200 may be connected to a pedal 101 to transfer or transmit the motion from pedal 101 to the wheels W1 and W2 causing the tricycle 100 to move forward. In this example, the pedal 101 is connected to a gearbox (not shown) inside the gearbox bracket. The gearbox is further connected to the drivetrain 200.

In some embodiments, the tricycle 100 can be driven by the pedal 101 or via motors installed in wheel hubs WH1 and WH2 on which the wheels W1 and W2, respectively, are mounted. In one embodiment, the drivetrain 200 is configured to allow free wheeling, for example, when a rider is not pedaling or keeps the pedal 101 stationary. The drivetrain 200 is connected to a frame portion 110. The drivetrain 200 is connected to the frame portion 110 in a pivotable manner. This allows the wheels W1 and W2 to be articulated independently of each other, for example during a turn or when the tricycle 100 leans. In one embodiment, the tricycle 100 can also include a second frame portion 120 configured to support a balance-assist system, which will be discussed later in the disclosure.

It can be understood by a person of ordinary skill in the art that the present disclosure is not limited to receiving power via a pedal 101 and any appropriate power source may be coupled to the drivetrain 200 to transmit the input power to the wheels W1 and W2. Furthermore, a person of ordinary skill in the art can understand that the tricycle 100 may be further configured to include an accelerator coupled to the motors installed in the wheel hub WH1 and WH2 so that the speed of the vehicle may be controlled.

In some embodiments, the independent articulation of the swing arms may be achieved by coupling the swing arms from pivot points on the frame of the vehicle. As one swing arm moves relative to the other swing arm (e.g., in an up or a down direction), the vehicle can lean toward left or right, while pivoting on the rear wheels that remain in contact a road surface. The mechanical structure of the systems herein lets the vehicle lean into turns while also keeping the wheels firmly in contact with the road surface. Hence, the structure herein creates positive traction at all times.

In the present disclosure, any electric vehicle may be configured to include swing arms 240L and 240R coupled to a frame of the vehicle and the rear wheels. In an embodiment, the electric vehicle includes a frame portion having a first side (e.g., a left side) and a second side (e.g., a left side). The electric vehicle includes a first rear wheel (e.g., W1 of FIGS. 1-4) disposed rearward relative to the frame portion at the first side and a second rear wheel (e.g., W1 of FIGS. 1-4) disposed rearward relative to the frame portion at the second side. The second rear wheel may be spaced from the first rear wheel with a wheelbase width therebetween in a range from 250 mm to 900 mm.

Figure 3:
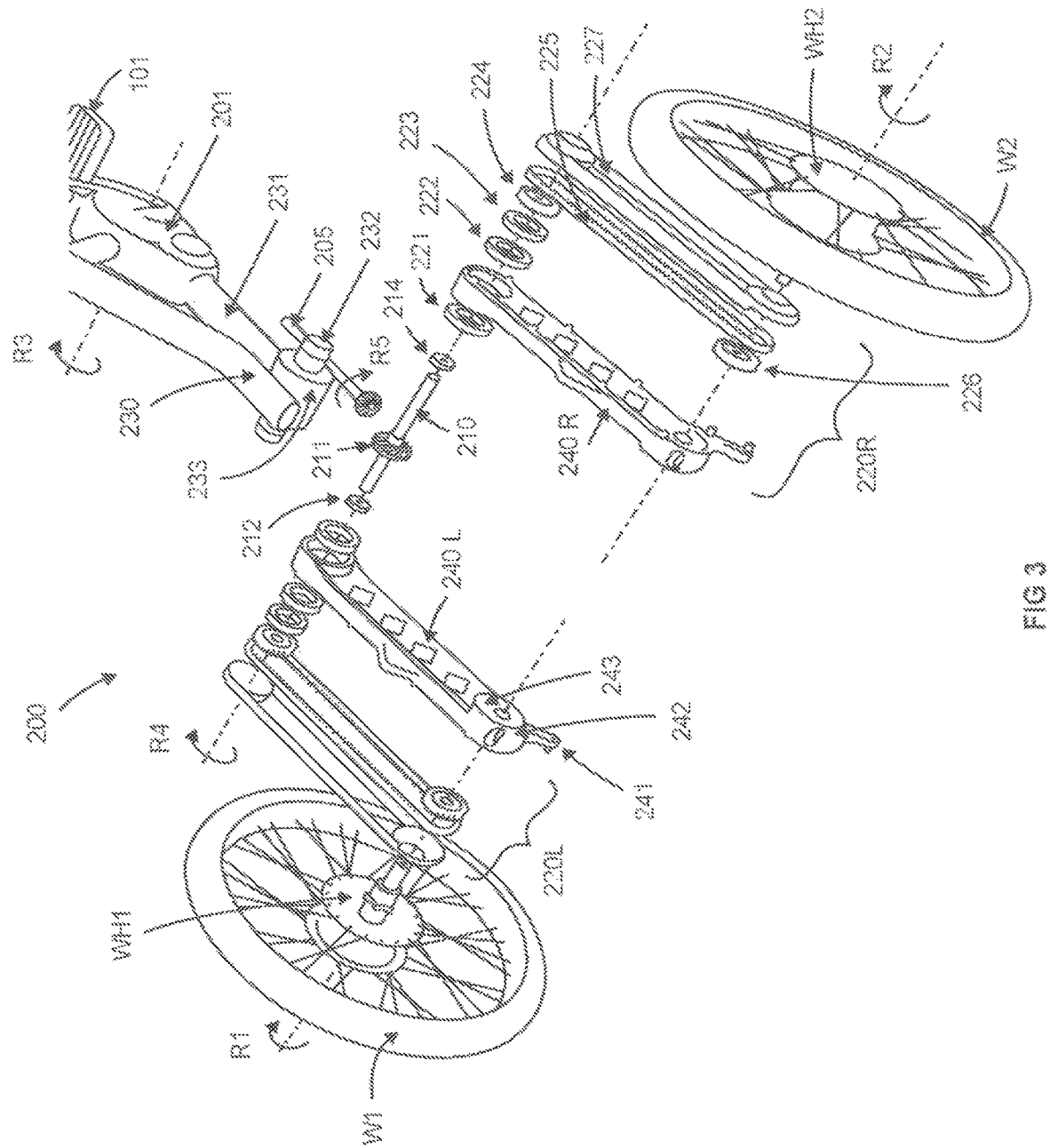
FIG. 3 is an exploded view of a drivetrain and swing arms implemented in the tricycle, according to an embodiment.

In an embodiment, the electric vehicle includes a first swing arm (e.g., 240L in FIG. 3) and a second swing arm (e.g., 240R in FIG. 3). In an embodiment, the first swing arm extends between the frame portion and the first rear wheel. The first swing arm pivotably couples to the frame portion at the first side and operably coupled to the first rear wheel. The second swing arm extends between the frame portion and the second rear wheel. The second swing arm may be pivotably coupled to the frame portion at the second side and operably coupled to the second rear wheel. In an embodiment, each swing arms are elongated in shape and have a length in a range from 250 mm to 600 mm. In an embodiment, a first end of the swing arm may be coupled to a frame, and a second end of the swing arm may be coupled to the wheel. An example implementation of the aforementioned components is further discussed in detail with respect to a tricycle for understanding purposes and does not limit the scope of the present disclosure to the tricycle.

FIG. 3 illustrates an exploded view of the drivetrain 200 configured to drive two rear wheels W1 and W2. In an embodiment, the drivetrain 200 includes an axel 210 having a first end (e.g., at the left-side) and a second end (e.g., at the right-side) and extending between the first swing arm 240L and the second swing arm 240R. The drivetrain 200 also includes a first drive mechanism 220L that may be housed in the first swing arm 240L and configured to transmit motion between the axel 210 and the first rear wheel W1. Similar to the first drive mechanism, the drivetrain 200 also includes a second drive mechanism 220R that may be housed in the second swing arm 240R and configured to transmit motion between the axel 210 and the second rear wheel W2.

In an embodiment, the first drive mechanism 220L disposed on the left side is similar to the second drive mechanism 220R disposed on the right side. As shown, the second drive mechanism 220R includes a cog 224 disposed at the first end of the first swing arm, another cog 226 disposed at the second end of the first swing arm 240L, and a drive belt 225 extending between the cog 224 and the cog 226. In an embodiment, the cog 224 is referred as a first cog 224 when referring to the first drive mechanism 220L or a third cog 224 when referring to the first drive mechanism 220R. In an embodiment, the cog 226 is referred as a second cog 226 when referring to the first drive mechanism 220L or a fourth cog 226 when referring to the second drive mechanism 220R.

In an embodiment, the first drive mechanism 220L transmits rotation motion of the axel 210 to the first cog 224, the drive belt 225 transmits the rotation of the first cog 224 to the second cog 226, and the second cog 226 transmits the rotation to the first rear wheel W1. In an embodiment, a first bearing 221 may be disposed adjacent to the first cog 224, and a second bearing 221 may be disposed adjacent to the first bearing 221 and coupled to the frame portion 110. In an embodiment, the first cog 224, the first bearing 221, and the second bearing 222 may be axial aligned and mounted on the axel 210 at the first end (e.g., right) of the axel 210. The second drive mechanism 220R is configured in a similar manner as the first drive mechanism 220L.

In an embodiment, the axel 210 supports and freely rotates with respect to the first swing arm 240L at the first end and the second swing arm 240R at the second end. In an embodiment, the longitudinal axis R4 of the axel 210 is parallel to axis of rotations R1 and R of the first rear wheel W1 and the second rear wheel W2, respectively.

In an embodiment, the axel 210 includes a bevel gear 211 mounted at a center of the axel 210 and configured to receive a rotation motion about a first axis of rotation (e.g., RS). The axis RS intersects with the longitudinal axis R4 of the axel 210 and converts the rotation motion about axis RS to a rotation of the axel 210 about the longitudinal axis R4. In an embodiment, the drivetrain 200 may include a pinion gear 205 meshing with the bevel gear 210, wherein the pinion gear 205 configured to rotate about the first axis of rotation RS.

As an example implementation, the drivetrain 200 may be configured in the tricycle 100 as follows. The pedal 101 may be connected to a gearbox 201. The gearbox may include a set of gears configured to transmit the rotational motion provided by the pedal 101 to other parts. The gearbox 201 may be coupled to a drive shaft 205. When the pedal 101 rotates about the axis of rotation R3, the gearbox 201 causes a rotation of the drive shaft 205 about the axis RS. The axis RS is the longitudinal axis of the drive shaft 205. The drive shaft 205 transmits the rotation motion to the axle 210. For example, the drive shaft 205 may be coupled to the axle 210 via the bevel gear 211 that converts the rotation motion of the drive shaft 205 about RS into rotation of the axle 210 about axis R4. In one embodiment, the axis of rotation R4 of the axle 210 is along the longitudinal axis of the axle 210. The rotation axis R4 is also parallel to the axis of rotation of the wheels W1 and W2. For example, wheel W1 rotates about axis R1 and wheel W2 rotates about axis R2.

In an embodiment, the first axis R1 and the second axis R2 are configured to move up and down relative to each other via the swing arms 240L and 240R. The first axis R1 and the second axis R2 are approximately coaxial when the tricycle is riding on a flat surface. The first axis R1 and the first second axis R2 are offset from each other when the tricycle 100 is driven on an uneven surface or when the tricycle is taking a turn.

In an embodiment, the electric vehicle includes a frame configured to support and house components of the drivetrain 200 and the swing arms 240L and 240R. In an embodiment, the frame includes a first hollow element extending parallel to an axis of rotation of the first rear wheel W1 and configured to pivotably support the first swing arm 240L at one end and the second swing arm 240R at an opposite end. In an embodiment, the first bearing of the first swing arm is mounted at the one end of the first hollow element, and the first bearing of the second swing arm is mounted at the opposite end of the first hollow element.

In an embodiment, the frame portion further includes a second hollow element intersecting with the first hollow element at an angle and extending away from the rear wheels. In an embodiment, the first hollow element is configured to receive the axel 210 inside a hollow portion, and the second hollow element is configured to receive the pinion gear.

An example implementation of the frame portion and drivetrain 200 in the tricycle 100 is discussed with respect to FIGS. 3 and 4. As shown in FIGS. 3 and 4, the frame portion 110 is configured to support the pedal 101 and house the gearbox 201. The pedal 101 is connected to the gearbox 201. The frame 110 includes a T-junction 230. The T junction 230 includes a drive shaft housing portion 231, a swing arm mounting portion 232 and a differential housing portion 233. The drive shaft housing portion 231 includes a first hollow portion configured to support or house a drive shaft 205 inside the hollow portion. The differential housing portion 233 includes a second hollow portion configured to house the axle 210. The swing arm mounting portion 232 is configured to pivotably support the swing arms 240L and 240R. For example, the mounting portion 232 supports the bearings 221 and 222 at one end, and similar bearing at an opposite end. As shown, the bearings are 221 and 222 are placed at the front end of the swing arm 240R. The first hollow portion 231 and the second hollow portion 233 intersect each other at an angle. Example: perpendicular to each other.

As mentioned earlier, the drivetrain 200 includes the axle 210 and two drive mechanisms 220L and 220R. The first drive mechanism 220L is coupled to the first rear wheel W1, and the second drive mechanism 220R is coupled to the second rear wheel W2. The axle 210 extends between the two wheels W1 and W2. In an embodiment, the axle 210 is supported by the bearings 212 and 214 inside the differential housing portion 233 of the T-junction 230. The bearings 212 and 214 allows the axle 210 to rotate freely about axis R4. In an embodiment, the rotation of the axle 210 causes the rotation of the cog 224. The rotation of the cog 224 is further transmitted to the other cog 226 via the belt drive 225. The other cog 226 is connected to the second rear wheel W2. In one embodiment the cog 224 can be coupled to the axle 210 and locked in place with the axle by the locknut 223.

In an embodiment, the drive mechanism (e.g., 220L and 220R) may be housed in a hollow portion between a swing arm (e.g., 240L and 240R) and a belt drive cover 227. In the following discussion, a swing arm may be generally referred by reference number 240 since the two swing arms herein have similar configuration and structure. It can be understood that a right-side swing arm is referred as 240R and the left side swing arm is referred as 240L. Similarly, a drive mechanism may be generally referred by reference number 220 since the two drive mechanisms herein have similar configuration and structure. It can be understood that a right-side drive mechanism is referred as 220R and the left side drive mechanism is referred as 220L.

In one embodiment, referring to FIG. 3, the belt drive cover 227 can be removably attached to the swing arm 240. In one embodiment, the components of the drivetrain mechanism 220 can be placed between the swing arm 240 and the drive belt cover 227. In one embodiment, the second bearing 222, the lock nut 223, and the cog 224 may be placed between the swing arm 240 and the belt cover 227 at the first end. In one embodiment, the other cog 226 may be placed between the swing arm 240 and the belt cover 227 at the second end. In one embodiment, the first bearing 221 may be placed on an outer side of the swing arm 240 such that the first bearing 221 can be mounted on the first swing arm mounting portion 232 of the T-junction 230.

Figure 4A:
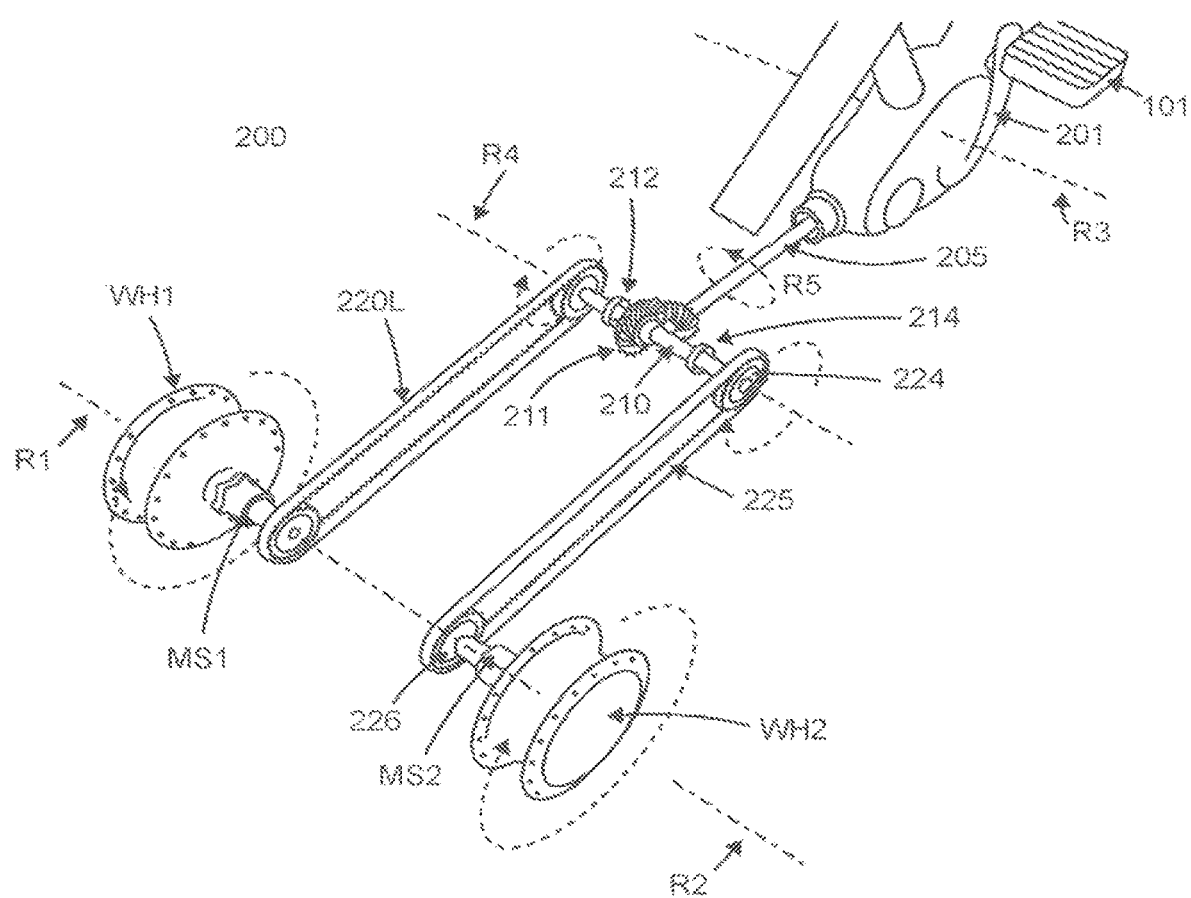
FIG. 4A illustrates an assembly of a portion of the drivetrain (without the swing arms) implemented in the tricycle, according to an embodiment.
Figure 4B:
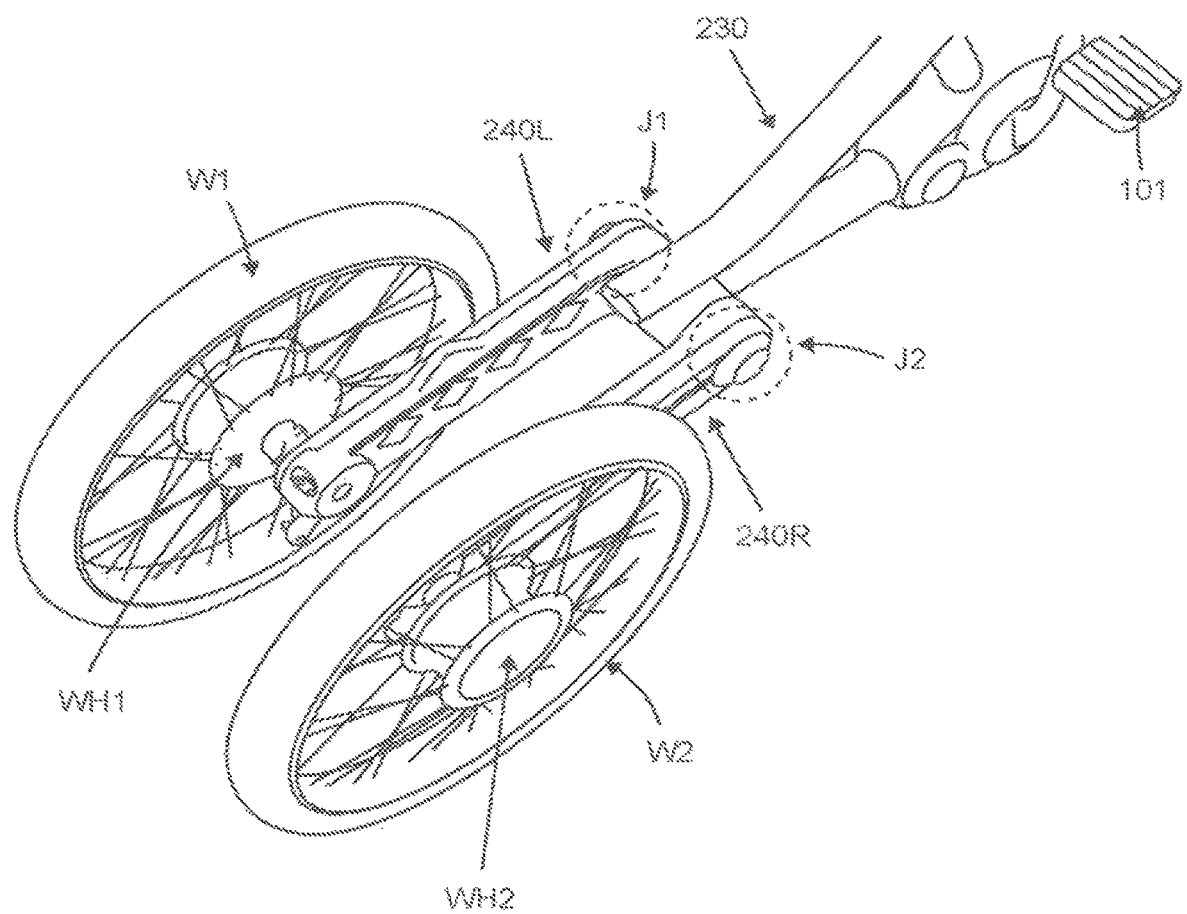
FIG. 4B illustrates an assembly of swing arms implemented in the tricycle, according to an embodiment.

As shown in FIGS. 3 and 4B, upon coupling the first end of the first swing arm 240L to the swing arm mounting portion 232 of the T junction 230 and coupling the second end of the swing arm 240L to the rear wheel W1 allows the rear wheel W1 to pivot about the frame 110 via the swing arm 240L (at the first end). Similarly, the first end of the second swing arm 240R may be mounted to the swing arm mounting portion 232 and the second end may be coupled to the second rear wheel W2. Therefore, upon assembly, the first rear wheel W1 and the second rear wheel W2 are configured to articulate independently of each other, for example, when riding on an uneven surface or when taking a turn.

In one embodiment, as shown in FIG. 3, the swing arms 240L and 240R may be further configured to include a belt tensioner 243 to allow mounting and removing of the wheels. For example, during mounting, the belt tensioner 243 may loosen the belt drive 225 allowing the wheel W1 to be coupled at the second end of the swing arm 240L. Further, a wheel axel clamp 242 may be provided to lock the wheel to the swing arm. In one embodiment, a brake such as disk brake may be coupled to the swing arms. For example, a hydraulic disk brake's caliper mount 241 may be attached to the swing arm at the second end, while the disk may be attached to the wheel. Hence, upon engaging the brakes, the caliper engages with the disk to gradually stop the vehicle.

In another embodiment, the electric vehicle may not include a pedal. In this case, the gearbox 201, the drivetrain 200, and the cover 227 may not be included, while the swing arms 240 may be coupled (e.g., by bearings) between the wheels and the frame as discussed herein. For example, the drivetrain 200 components such as the drive shaft, the axel, the first cog, the belt drive, and the second cog may be omitted. In this case, the electric vehicle may be motor driven (e.g., motor coupled to the wheels). In an embodiment, each motor coupled to a corresponding wheel may be driven independently or synchronized with each other.

FIG. 4A illustrates an assembly of the drivetrain 200 to the pedal 101 of the tricycle 100. As shown and discussed earlier, the pedal 101 is connected to a gearbox 201 in the gearbox housing of the frame portion 110. The drive shaft 205 is coupled via the bevel gear 211 to the axle 210. The axle 210 is coupled to the cog 224 on a left side and another cog 224 on the right side of the axle 210. The cog 224 is coupled to a belt drive 225 which drives the other cog 226. The cog 226 is in turn coupled to a wheel shaft or a motor shaft MS2 of a motor housed in the wheel housing WH2. During operation, the pedal 101 rotates about the axis R3 causing a rotation of the drive shaft 205 about the axis RS. The rotation of the drive shaft 205 is converted into a rotation of the axle 210 via the bevel gear 211. The axle 210 rotates about the axis R4 which is perpendicular to the axis of rotation RS. The rotation of the axle 210 causes rotation of the first wheel W1 and the second wheel W2.

When the tricycle 100 is motor driven or the pedal 101 is stationary, the motor drives the wheels W1 and W2. The drive mechanism 220L and 220R operate to move the tricycle 100 in a forward direction, for example. Further, the cog 224 may be configured to free wheel. As such, the pedal 101 may not be engaged to transmit the motion between the wheels to the pedal.

FIG. 4B illustrates an assembly of the drivetrain 200 to the frame and the rear wheels W1 and W2. In FIG. 4B, the first swing arm 240L is coupled to the T-junction 230 forming a joint J1. The joint J1 is a pivotable joint that allows the swing arm 240L to pivot about the frame. Similarly, the second swing arm 240R is coupled to the right side of the T-junction 230 forming a joint J2. The joint J2 is also a pivotable joint that allows the second swing arm 240R to pivot about the frame. Such pivoting action about the joints J1 and J2 allows the first rear wheel W1 and the second rear wheel W2, respectively, to move independently of each other in an upward and downward direction.

Figure 4C:
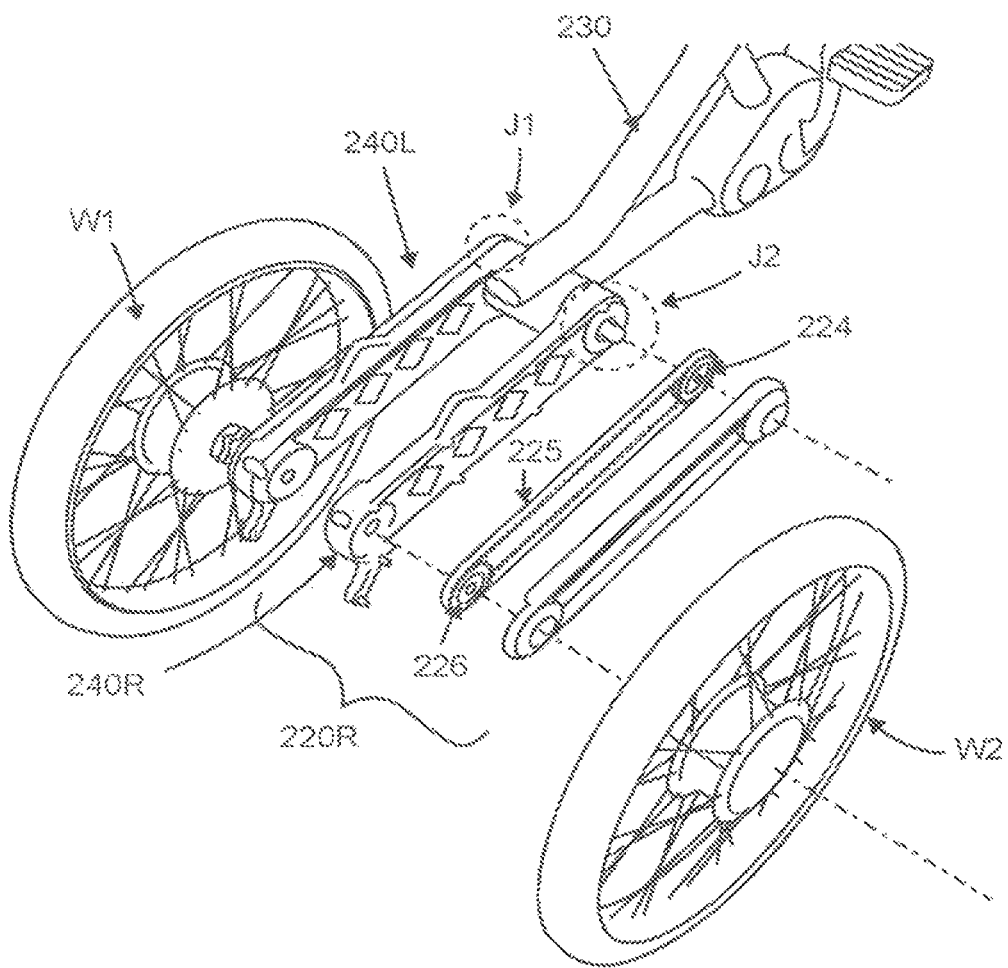
FIGS. 4C, and 4D illustrate right-side exploded views of a right-side swing arm implemented in the tricycle, according to an embodiment.
Figure 4D:
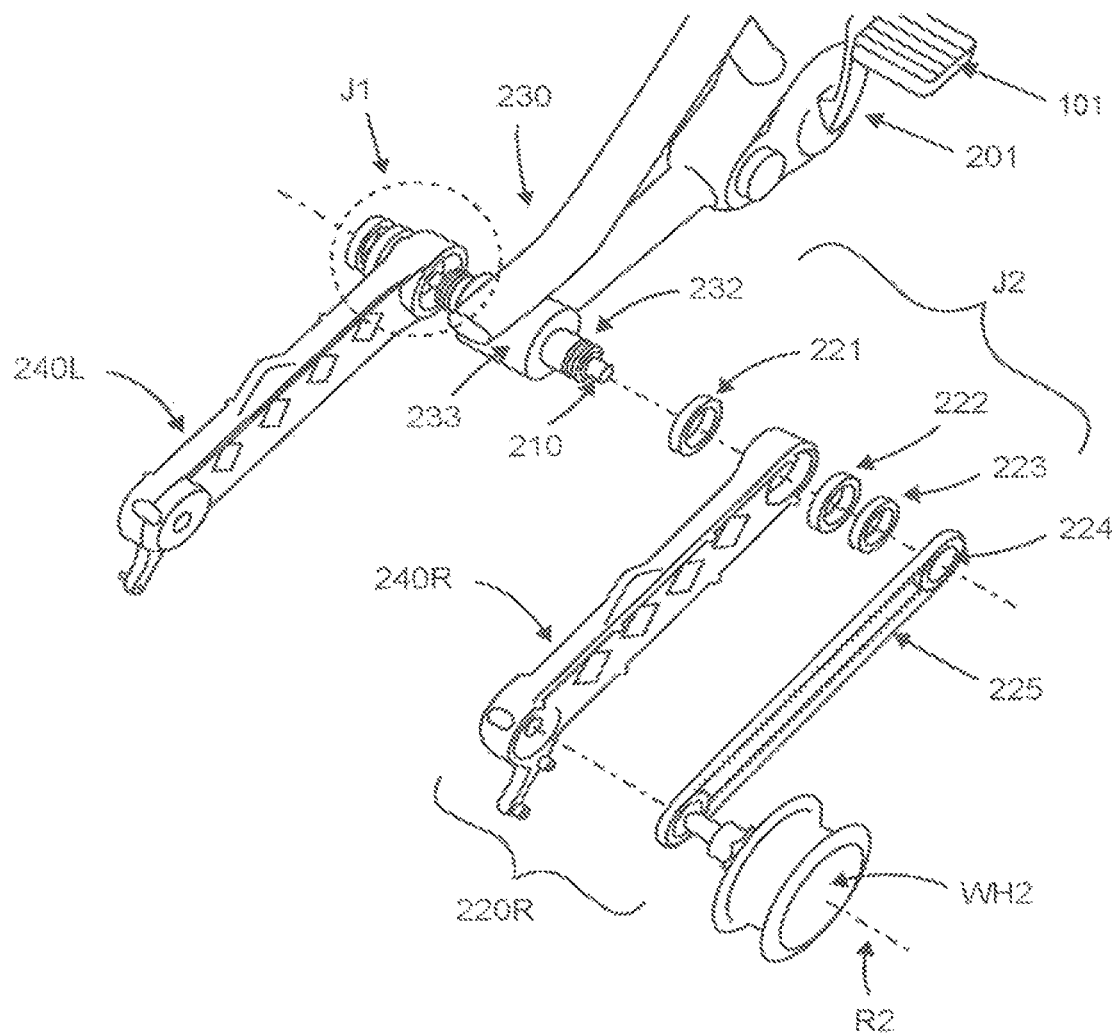

FIG. 4C illustrates a right-side exploded view showing an assembly of the second swing arm 240R, the drive mechanism 220R and the wheels W1 and W2. As shown the joint J2 includes the first bearing 221 and the second bearing 222. The joint J1 has a similar assembly. FIG. 4D further illustrates the exploded view of the joints J1 and J2. As shown the joint J2 is formed by coupling the first bearing 221 to the mounting portion 232. The first bearing 221 is located between the mounting portion 232 and the swing arm 240R. The second bearing 222 is located on the other side of the swing arm 240R and between the swing arm 240R and the first cog 224.

FIG. 4D shows the axel 210 passing through the bearings 221 and 222 and connecting to the first cog 224 via the locknut 223. The bearings 221 and 222 are mounted on an outer side of the hollow portion of the mounting portion 232 of the frame, while the axel 230 is mounted inside the differential housing portion 233. As such, the swing arm 240R can pivot about the mounting portion 232 while the axel 210 can drive the first cog 224. Hence, the rotation of the axel 210 and the pivot action of the swing arm 240 can be achieved simultaneously.

Figure 4E:
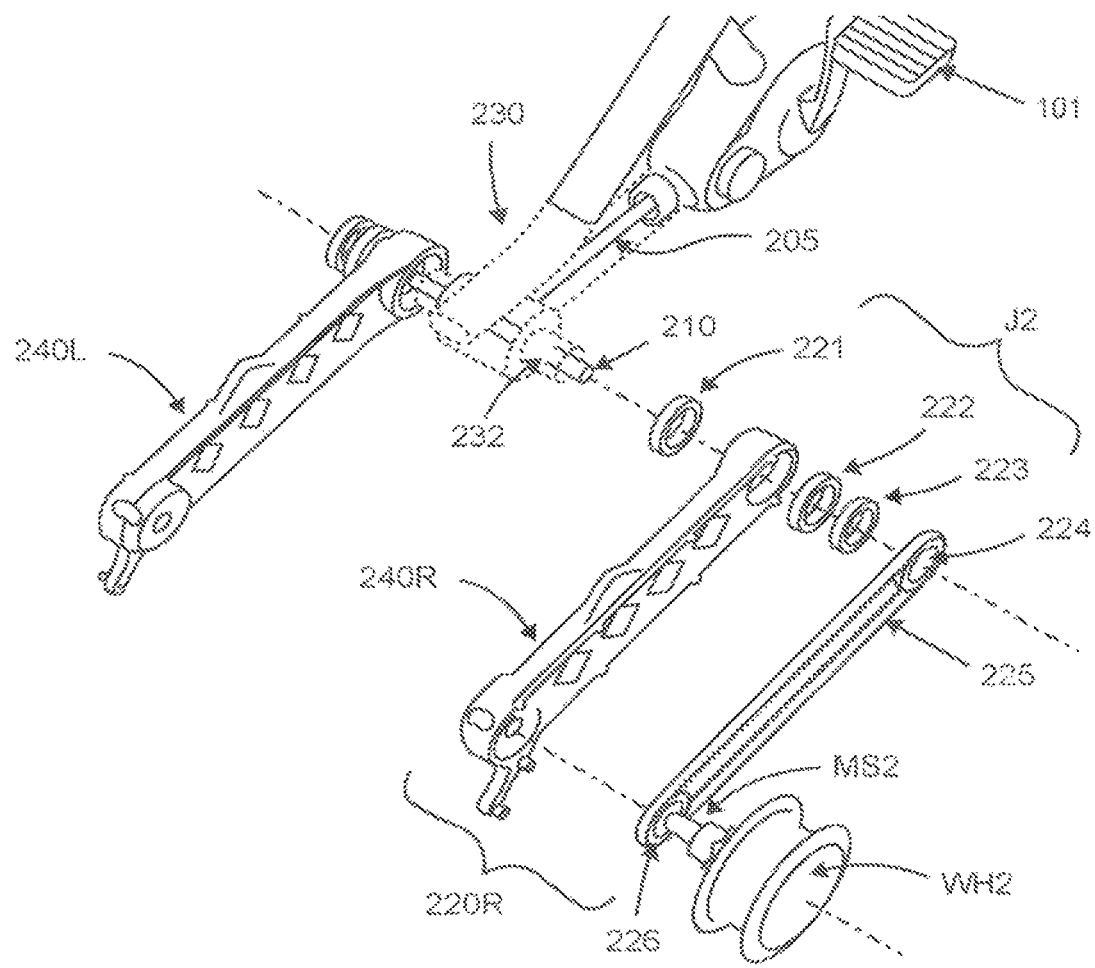
FIG. 4E illustrates the right-exploded view of a right-side swing arm with a portion of the frame being transparent to illustrate connection with components inside the frame, the implemented being in the tricycle, according to an embodiment.
Figure 4F:
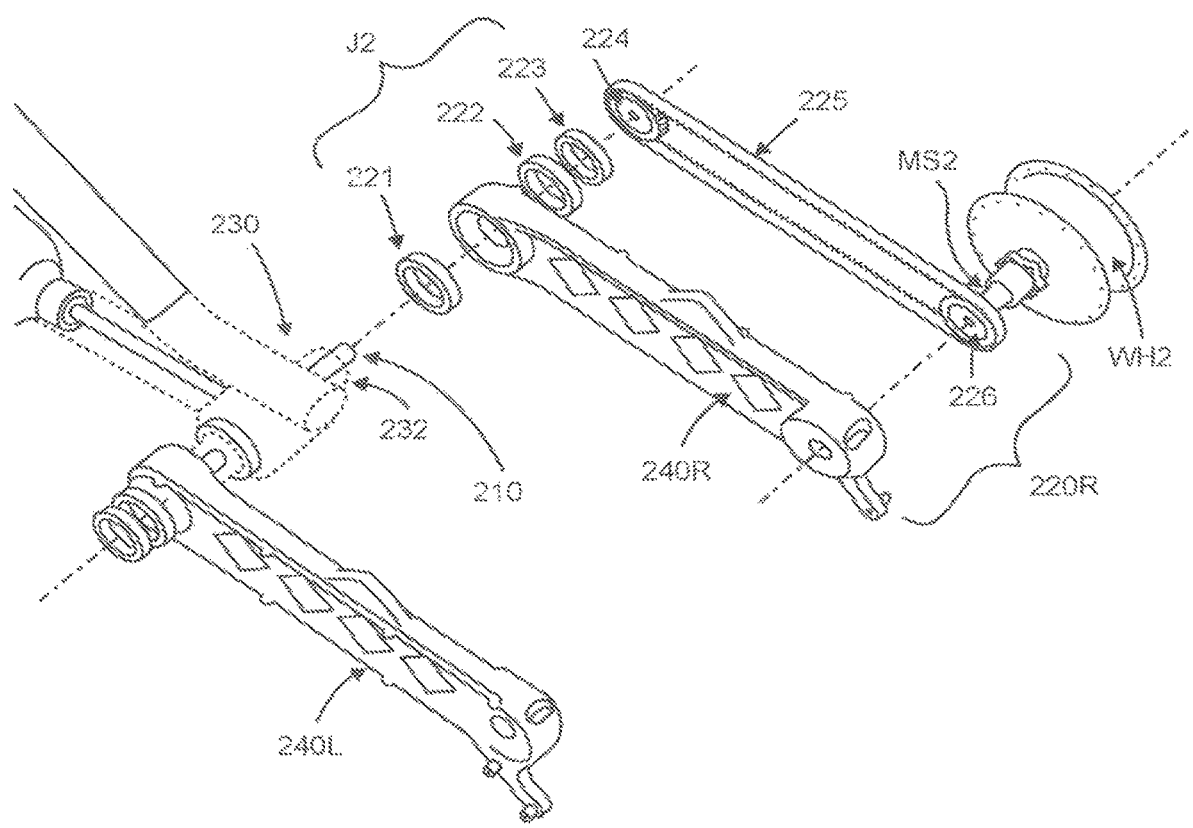
FIG. 4F illustrates a left-side exploded view of a right-side swing arm with a portion of the frame being transparent to illustrate connection with components inside the frame, the implemented being in the tricycle, according to an embodiment.

FIGS. 4E and 4F further illustrate the joints J2 and the relative mounting with respect to the axel 210. As shown in FIGS. 4E and 4F the swing arm 240R includes a pocket on either side of the swing arm to house the first bearing and the second bearing 222, respectively. The pocket of the swing arm is of the size of an outer diameter of the bearings 221 and 222. The inner diameter of the bearings 221 and 222 are approximately similar to the outer diameter of the mounting swing arm mounting portion 232 to allow a press fit therebetween. The diameter of the axel 210 is less than the inner diameter of the bearing 221 and 222. Thus, the axel 210 can pass through the bearings 221 and 222 without coming in contact with each other. It can be understood by a person of ordinary skill in the art that the scope of the present disclosure is not limited to the two bearing arrangement for creating a pivotable structure. In an example, a single bearing may be employed or other pivotable structure may be appropriately sized to couple the swing arms to the frame.

The systems discussed herein provides several advantages for improving driving experience of an electric vehicle. Following non-limiting advantages are discussed with respect to a tricycle. Similar advantages may be experience when the systems herein are installed or implemented in a car or other vehicles having at least two rear wheels.

In case of the tricycle use case, the swing arms 240 enable the tricycle drivetrain 200 to be coupled to independently powered rear wheels W1 and W2 that provides the ability to ride and perform with the maneuverability, agility, and performance dynamics of a bicycle and maintain the stability performance dynamics of a rigid tricycle. The system herein provides the tricycle with independently powered and articulating rear wheels W1 and W2 to transfer power from the pedal 101 and gearbox to the wheels W1 and W2.

The system herein provides the tricycle with independently powered rear wheels W1 and W2 the ability to lean (tilt, swing, or bank) left and right into turns or curves so that both rear tires maintain contact with the road surface in a controlled manner.

The system herein provides a tricycle with independently powered rear wheels the ability to eliminate a chain or belt drive linking the gearbox 201 with the rear wheels W1 and W2. Instead, an axel 210 (also referred as a track differential) passes the power via an encapsulated drive shaft 205 to the rear wheels W1 and W2. The drive shaft 205 passes power from gearbox 201 to the axel in the T-junction. From the axel power is transferred to the cog via the belt drives that may be housed in the swing arms.

The system herein provides a tricycle with independently powered rear wheels the ability to pass a load or weight of the tricycle evenly over the rear wheels while maintaining the ability to lean into turns without losing pedal power to the rear wheels. This feature may be achieved by the T-Junction 230 on a back section of the frame 110 that houses the axel 210 with freewheel mechanics. The hinging action allows the swing arms 240 to freely move up and down like a lever from a single hinge point at the frame, letting the wheels maintain contact with the road surface as the tricycle leans.

The system herein provides a tricycle with independently powered rear wheels the ability to transfer pedal power from a single gearbox drive shaft 205 to a bevel-pinion 211 based track differential or axel 210 that splits the power into left and right outputs. The axel 210 is housed and supported by a structure that also supports and houses the swing arms 240 hinging mechanisms. The axel 210 divides the pedal power output from the drive shaft 205 into the left and right drive belts 227 that independently power the rear wheels W1 and W2.

The system herein provides a tricycle with independently powered rear wheels the ability to transfer power from the axel 210 outputs to the wheel axels through a cog set 224 and 226, and a belt drive 225 that is housed within the swing arms 240. The front cog 224 incorporates a mechanical freewheel that lets the belt drive system 225 remain stationary when rider pedal power is not engaged. The freewheel arrangement reduces "wear and tear" on the mechanical structure and enables the wheels to roll backward without engaging the drivetrain, keeping the axel and pedals motionless.

The wheel axel clamps 242 at the end of the swing arms 240 secures the rear wheel's single axel motor hub with a fastening system that incorporates a mechanical drive belt tensioning component 243. The drive belt tensioning component 243 permits the wheel to be easily put in place on the swing arm 240 before extending the tensioning component that stretches the drive belt to achieve a desired belt tension for proper transmission of motion.

In one embodiment, the electric vehicle may be provided with a balance assist system. The balance assist system accounts for any dynamic movement in the vehicle experienced at high speeds, during shifting off loads, etc. The balance assist system provides a safer and a more stable maneuverability at desired speeds. For example, when the electric vehicle is cruising on a flat surface, keeping the vehicle upright is simple. However, when stopped or when riding slowly with a heavy load, or when the balance shifts as the rider or the passengers move relative to the vehicle, the vehicle may experience tilting or leaning, which may affect the maneuverability of the vehicle.

In one embodiment, the balance assist system is regulated using a tilt control system (also be referred as tilt control mechanism, or the tilt control unit). In an embodiment, the tilt control system balances the load of movement of the vehicle based on a motor, sensors and/or a gyroscope, and a processor configured to receive sensor data, process the sensor data to determine an angle of tilt, and control a tilt control means (e.g., motor, electro-magnetic lock, etc.) based on the angle of the tilt.

In one embodiment, the processor is configured to include instructions, which when executed causes the processor to perform following operation. In an embodiment, includes instructions to communicate with sensors that measure the angles of the swing arms, the relative position of the vehicle lean to gravity, vehicle speed, and/or load or weight of the vehicle to determine an optimal angle of tilt of a tilt blade. In an embodiment, the processor includes instructions to adjust the tilt of the vehicle based on the sensors and/or gyroscope data by controlling the motor. For example, the sensors respond to the rider movements (e.g., angle, shift in weight, etc.) and the road surface conditions to collect sensor data such as an amount of tilt of the vehicle, speed of the vehicle, a shift load causing a shift in center of gravity, etc. In an embodiment, one or more sensors may be included and located within the tilt control system (e.g., adjacent to the tilt control means to measure an angle of rotation), a frame of the vehicle (e.g., to determine shift in load or tilt of the vehicle), on or under the seat (e.g., to determine shift of the rider position), handle, or other appropriate location on the vehicle, etc. The sensor data is sent to the processor which determines based on the sensor data, an optimal tilt of the vehicle to balance the load.

The processor may be configured to enable the tilt control system to be operated in a plurality of modes. For example, in a first mode, the tilt control system may lock the vehicle at a particular angle (e.g., 0°, 5°, 10°, etc.). In a second mode, when the vehicle is traveling at low speeds (e.g., less than 3 mph), the tilt control system may control the tilt of the vehicle within a smaller range. For example, the tilt may be controlled within +6° angle about the center of gravity of the vehicle. In a third mode, when the vehicle is traveling fast (e.g., greater than 3 mph), the tilt control system enables free leaning of the vehicle, for example, by allowing the wheels to move up and down relative to each other causing a tilt to be maintained within +30° angle about respect to the center of gravity.

The modes are further discussed in view of implementation in a tricycle, as follows. In a first mode (also referred as "locked" mode), the tilt control system disengages control and mechanically locks the swing arm's tilting function (lean) keeping the vehicle securely in an upright position, plum to gravity.

In the second mode (also referred as "enabled"), when the tricycle detects forward vehicle movement e.g., up to a desired speed limit (e.g., 3 mph), the tilt control system activates to provide tricycle-like vehicle balance assistance. The tilt control system recognizes the tricycle's relative lean angle to the road surface, keeping the vehicle upright and vertical within a narrow "lean angle" margin of approximately 6° in each direction about the center of gravity. The tilt control system fed with sensor data from one or more sensors, responds to rider movements and the road surface, controlling and moving swing arm angles to position the vehicle's vertical balance. In an embodiment, when the tilt control system activates, an indicator light in a button on a handlebar (e.g., in FIG. 9A).

In the third mode (also referred as "free-lean"), as vehicle speeds increase past the speed limit (e.g., 3 mph), the tilt control system automatically disables, allowing the tricycle to lean freely up to 30° in each direction so that the tricycle riding feels like a bicycle-like behavior.

The tilt control system has several advantages. The tilt control system enables a tricycle to transition the driving dynamic between "balance assisted" and "free-lean" riding at a safe and appropriate moment. In an embodiment, the tilt control system is automatically enabled when riders shift the drive mode system into "Drive."

The tilt control system automatically disengages when the tricycle's speed—recognizing vehicle load weight—accelerates beyond the tricycle's ability to safely corner, turn, or vector without overturning, or tipping over. For example, the threshold speed may be determined to be approximately 3 mph. Unlocking the tilt control system enables the tricycle to angle/lean into turns so that the leaning counteracts the centrifugal force of a high-speed tight turn.

The tilt control system automatically reengages when sensors indicate the tricycle's velocity—recognizing vehicle load weight—to be below the rider's ability to be easily balanced without constant attention.

Furthermore, the tilt control system enables a tricycle to lock and unlock the tilt control system at will when riding slowly or at a complete stop. This function permits the rider to maneuver the vehicle when they are walking or riding slowly. Riders can override the tilt control system by holding down the tilt activation button (e.g., 900 in FIG. 9A) for approximately 3 seconds. This action lets the vehicle lean freely until the rider releases the button, at which point the tilt control system automatically reengages, leveling vehicle balance.

In one embodiment, the activation and deactivation of the tilt control system may be controlled by one or more processors and the algorithm embedded within the processor. In one embodiment, the tilt control system may be controlled via a tilt control button provided on the vehicle. For example, the tilt control button may be provided on a handlebar and can be activated manually by the rider. In one embodiment, the tilt control button may be configured such that it cannot be activated at a high speed, for example, above 3 miles per hour. In this case, the processor automatically controls the activation and deactivation of the tilt control system.

Figure 9A:
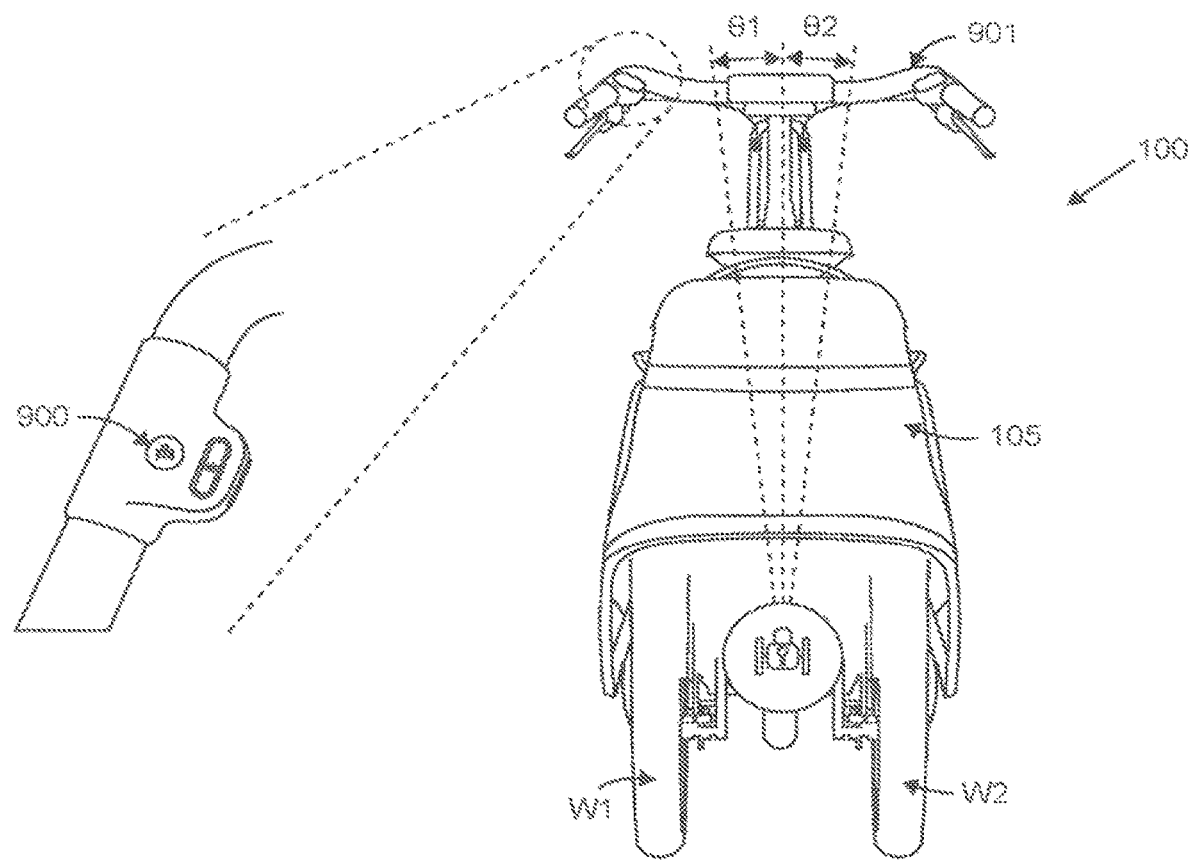
FIG. 9A illustrates a back view of the tricycle with a handle having a tilt control button on a left side of the handle, according to an embodiment.
Figure 9B:
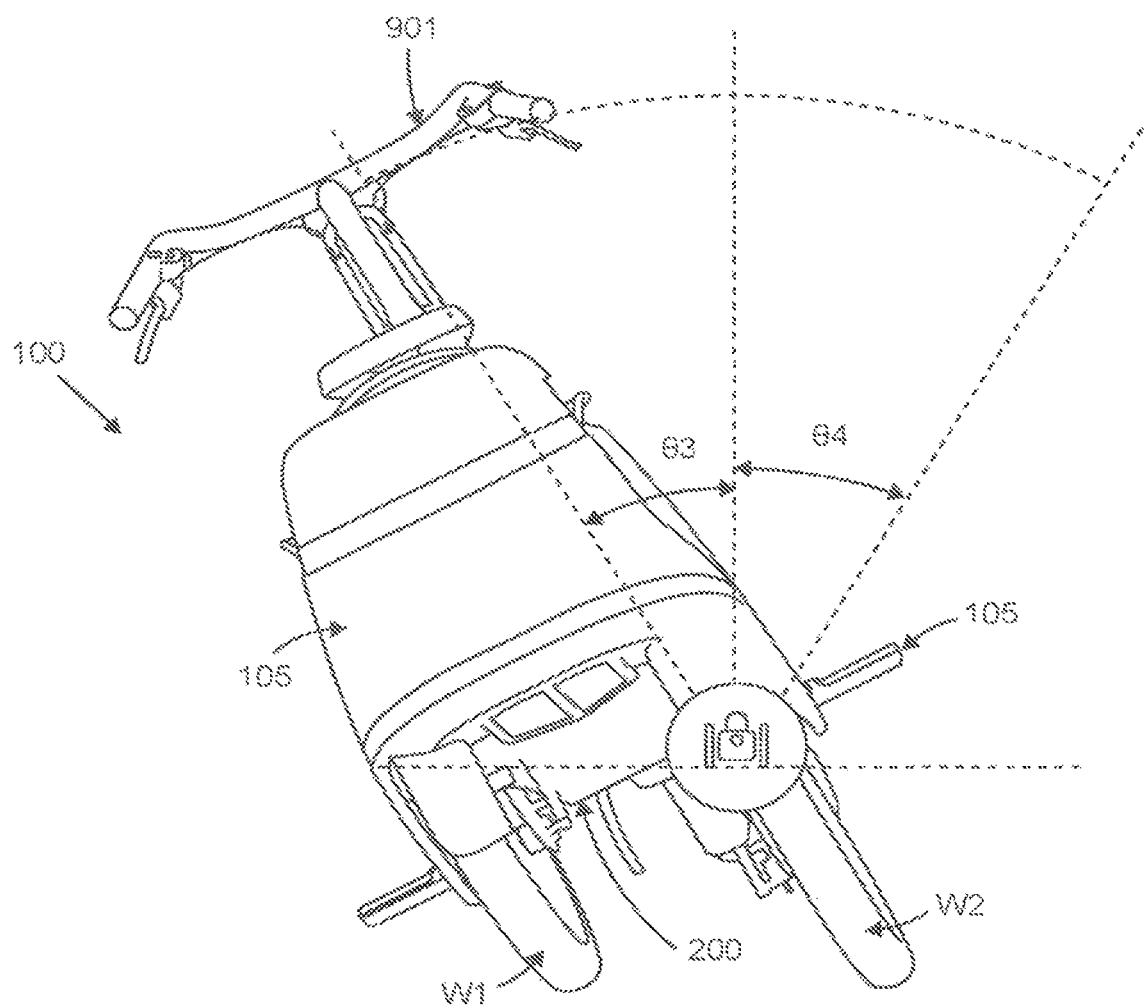
FIG. 9B illustrates a back view of the tricycle in a free lean position, according to an embodiment.

FIG. 9A illustrates an example of the location of a tilt control button 900 provided on the handle 901 of a tricycle 100. In one embodiment, when the tilt control button 900 is activated, the tilt control system allows the vehicle to lean within a desired range between 81 (e.g., −6°) and 82 (e.g., +6°) about to the center of gravity, as shown. In one embodiment, when the tilt control button 900 is deactivated, the vehicle may be locked at a certain angle, depending on the road condition. For example, if the road is flat, the angle may be 0°. If the road has a banking angle of 2°, then the locking angle may be approximately 2°. In one embodiment, when the vehicle speed goes above a desired threshold, for example, 3 mph, the tilt control button 900 may not be activated or deactivated manually. In this case, the processor may be configured to control the activation and deactivation based on the sensor data such as the speed of the vehicle, position of the vehicle including tilt, position of the rider, etc. For example, as shown in FIG. 9B, the processor controls the tilt of the vehicle within angle 83 (e.g., −30°) and 84 (e.g., +30°) about the center of gravity. In an embodiment, the processor is communicably couple to a motor to enable the tilt control.

Figure 5:
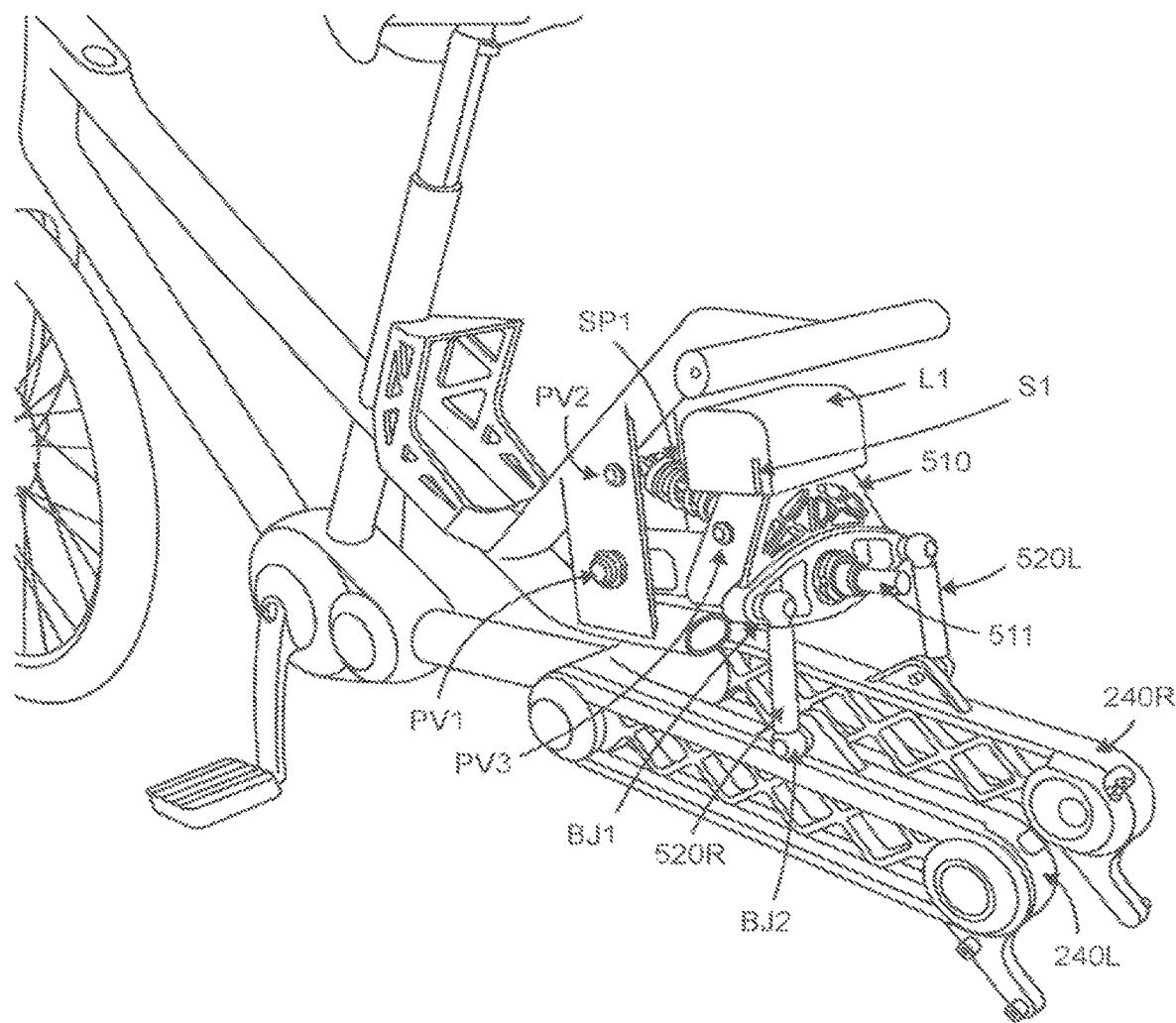
FIG. 5 illustrates a first tilt control system for controlling a tilt of a tilt blade using a caliper locking system, according to an embodiment.
Figure 6:
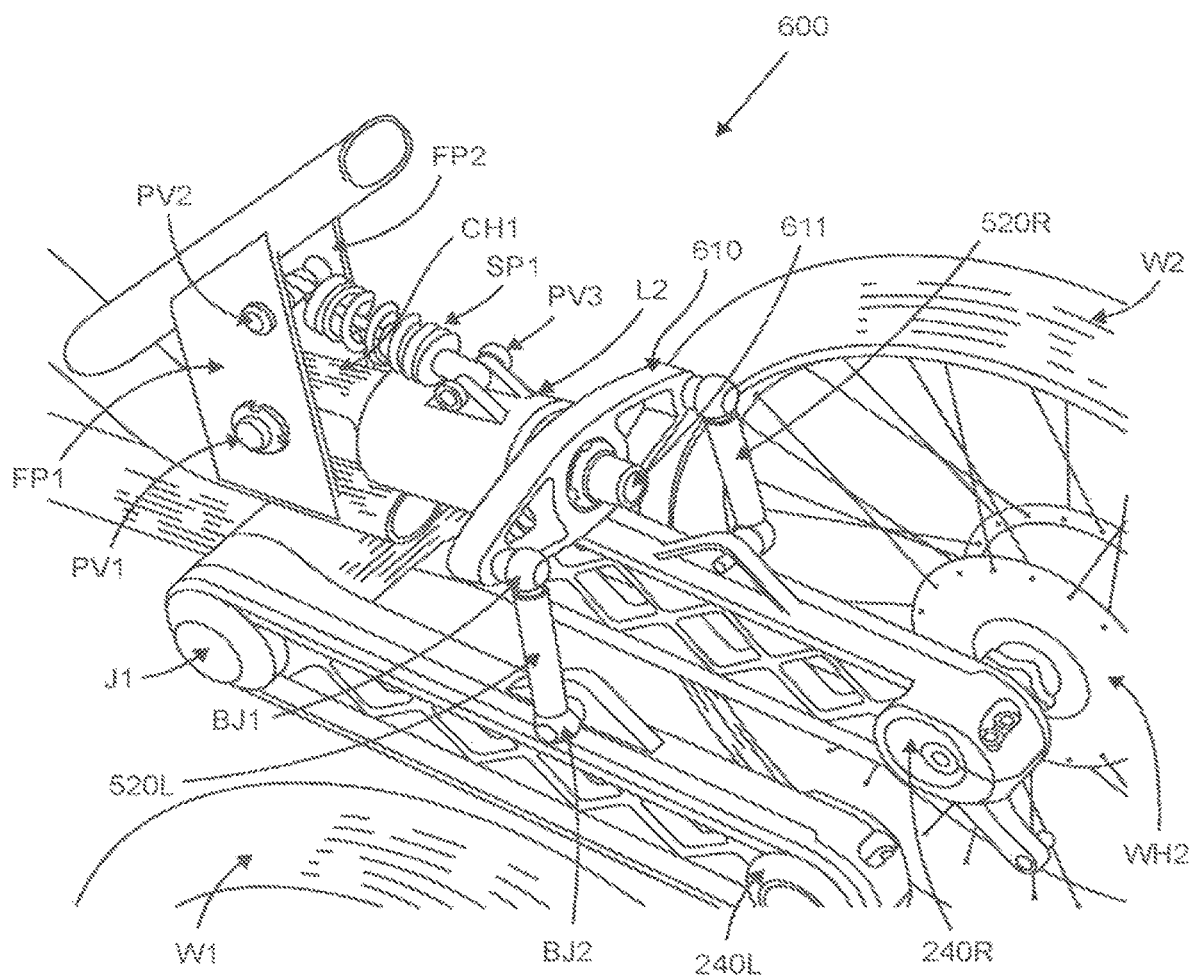
FIG. 6 illustrates a second tilt control system for controlling a tilt of a tilt blade using an electromagnetic lock, according to an embodiment.
Figure 7:
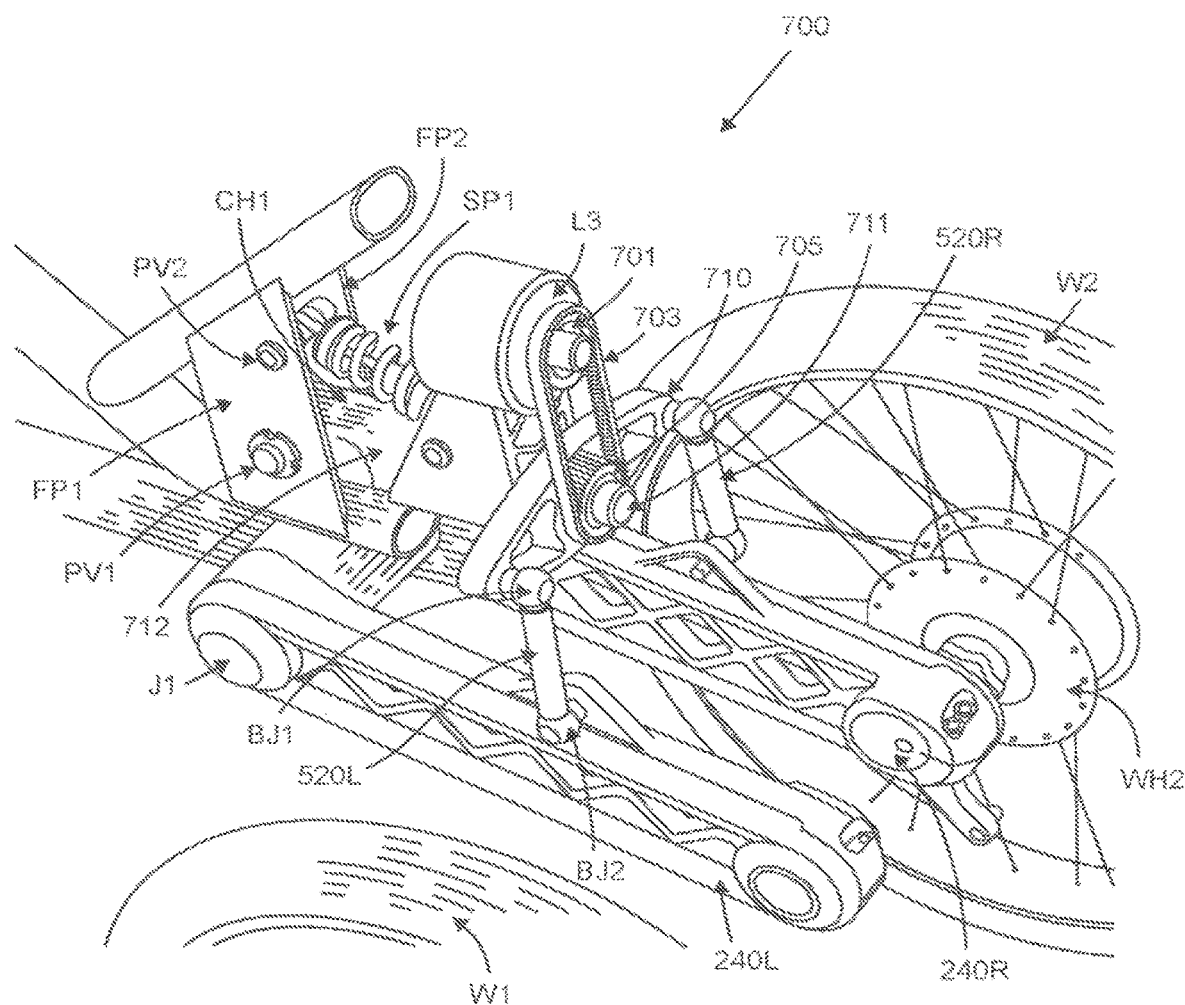
FIG. 7 illustrates a third tilt control system for controlling a tilt of a tilt blade using a motor coupled via a belt drive mechanism to a tilt blade axel, according to an embodiment.
Figure 8:
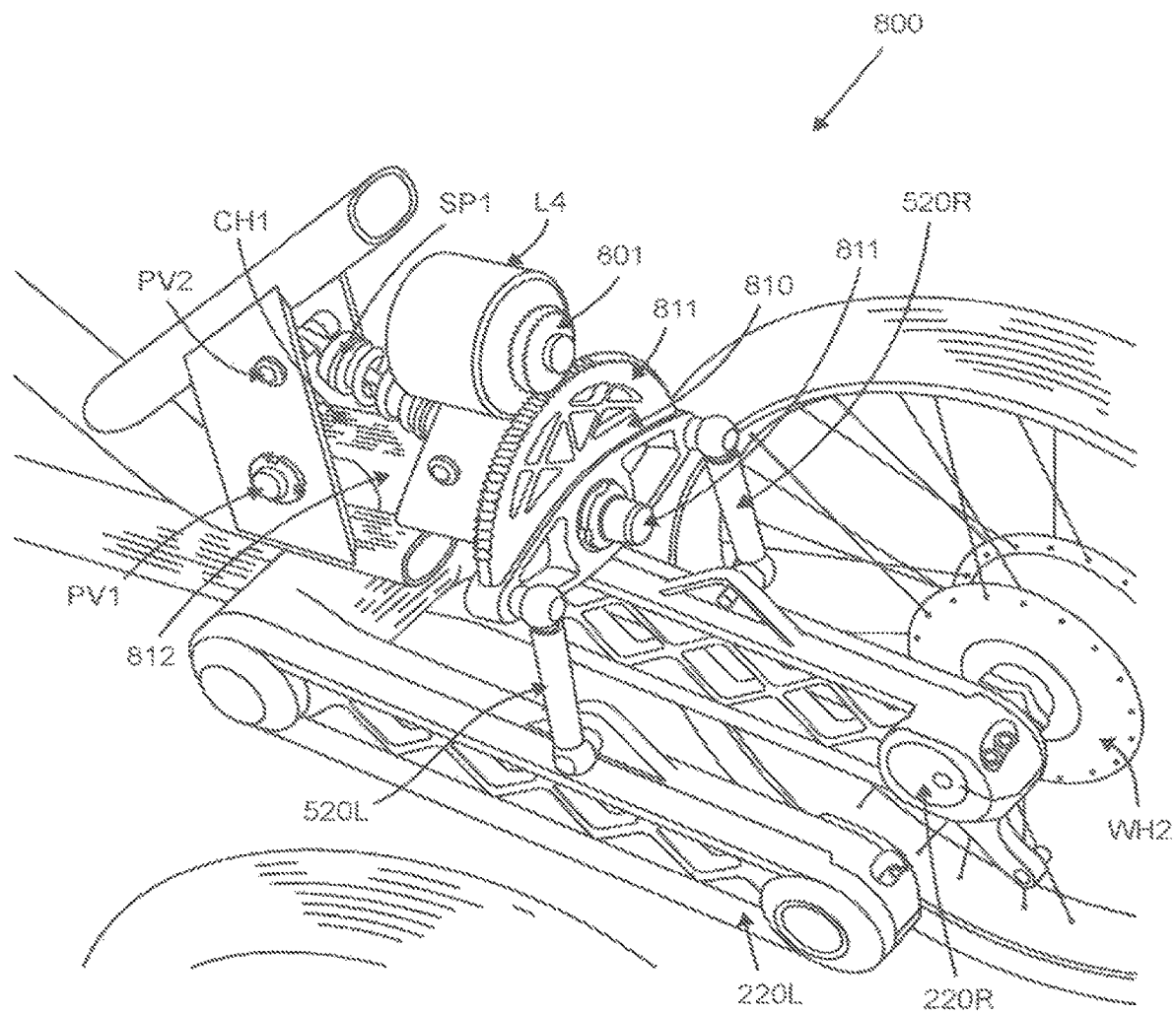
FIG. 8 illustrates a fourth tilt control system for controlling a tilt of a tilt blade using a motor coupled via a gear mechanism to a tilt blade axel, according to an embodiment.
Figure 13:
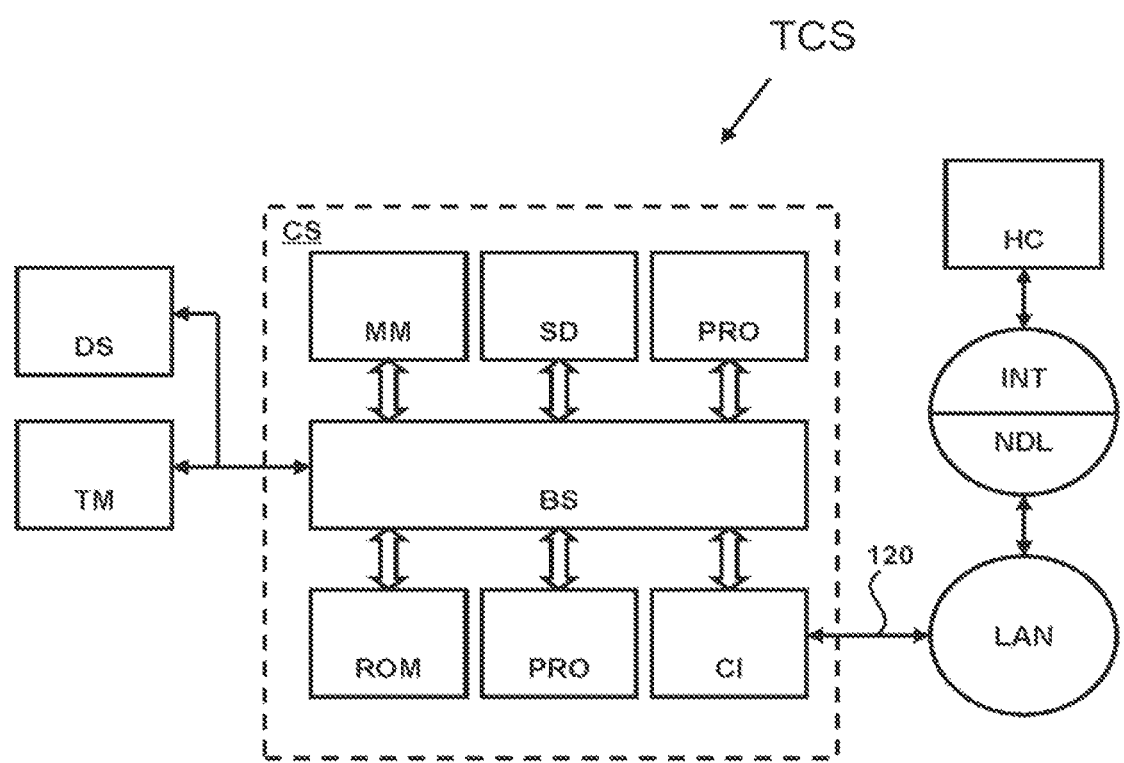
FIG. 13 illustrates a block diagram of a tilt control system, according to an embodiment.

In some embodiments, the tilt control system includes several mechanical elements configured to be controlled via a processor (e.g., processor PRO of a controller CS in FIG. 13). In an embodiment, the tilt control system includes a tilt blade coupled to the swing arms 240 (in FIG. 3). An amount of tilt of the tilt blade may be controlled by several mechanisms. The present disclosure is not limited to a particular mechanism to control the amount of tilt of the tilt blade. FIGS. 5 through 8 provide example implementations of the tilt control system. In FIG. 5, the tilt of the tilt blade may be controlled using a caliper locking system. In FIG. 6, the tilt of the tilt blade 510 may be controlled by an electromagnetic lock. In FIG. 7, the tilt of the tilt blade 710 may be controlled by controlling the motor. In FIG. 8, the tilt of the tilt blade 810 may be controlled by controlling the motor, coupled to the tilt blade via a gear mechanism. In FIG. 7, the tilt of the tilt blade 710 may be controlled by a motor coupled to the tilt blade 710 via a belt and pulley mechanism. The details of the tilt control system or tilt control system is further discussed in detail as follows.

In some embodiments, the tilt control system includes a tilt blade mounted on a tilt blade axel such that the tilt blade rotates about the axel. The tilt blade axel may be further coupled to a locking/unlocking mechanism. For example, the locking mechanism includes an electrical, magnetic, electro-mechanical, or electro-magnetic means that can receive commands from the process. In an embodiment, a tilt control motor may be configured to control the rotation of the axel, and thereby controlling the tilt and amount of tilt of the tilt blade. In some embodiments, the tilt blade is coupled to the tilt blade axel by a bearing that enables the tilt blade to freely rock and tilt towards the left or towards the right. In one embodiment, the tilt blade is secured to the bearing by a locknut.

In some embodiments, the tilt blade axel may be coupled to the electric vehicle via a suspension coil. In some embodiments, the suspension coil and the tilt blade axel are both held between frame plates that create a structure to assemble the tilt blade axel and the suspension coil in a pivotable manner to isolate their movements (e.g., in an up or down direction). In some embodiments, the frame plates allow the tilt blade axel to rock vertically via pivot pin hinges. Such assembly permits and controls the vertical movement of the tilt blade axel when the suspension coil contracts and expands. In some embodiments, the tilt blade is mounted at the lever end (e.g., an end opposite to the hinge support) of the tilt blade axel.

FIG. 5 illustrates a first tilt control system 500 employing a caliper-based locking/unlocking means. In one embodiment, the first tilt control system 500 includes a tilt blade 510 fixedly attached to a tilt blade axel 511. In an embodiment, the caliper L1 may be coupled to a tilt blade axel 511 and controlled by the processor to lock, unlock, or control rotation of the tilt blade 510. In one embodiment, the first tilt control system 500 is coupled, via mechanical structures, to the swing arms 240 (e.g., in FIGS. 1-4). In one embodiment, the swing arms may house a drivetrain 200 as discussed herein (e.g., with respect to FIG. 3). In one embodiment, the electric vehicle may include the swing arms 240, but may not include the drivetrain 200 (e.g., see FIG. 11).

As shown in the present example, the tilt blade 510 is coupled (e.g., by ball joints BJ1 and BJ2) to tie rods 520L and 520R (L and R indicates the left and right sides, respectively. Alternatively, also referred as tie rods 520) on either side of the tilt blade 510. In an embodiment, the tilt blade axel 511 may be a motor axel that moves the tilt blade 510 to a desired angle, thus the swing arms 240 moves into a position that creates vehicle balance.

In one embodiment, the caliper L1 is located inside a housing (also referred as caliper housing L1) and configured to control shifting between the different operating modes by gripping and locking the tilt blade axel 511 when the first tilt control system is disengaged.

The tilt blade 510 connects at either ends via tie-rods 520L and 520R to the swing arms 240L and 240R, respectively. The caliper housing L1 is connected to frame plates FP1 and FP2 having a guide channel CHI that isolate and resist horizontal sway movement for ride precision. The housing L1 may also be connected to the frame plates FP1 and FP2 via a suspension coil SP1 that allows for suspension coil compression action.

In an embodiment, the tilt blade 510 may be set on a bearing that enable it to freely rock both left and right and fixedly couple to the tilt blade axel 511 via a locknut. The tilt blade axel 511 and caliper lock housing L1 are connected to a frame portion (e.g., 120) through a suspension coil SP1 and tilt blade axel 511. Both the suspension coil SP1 and the tilt blade axel 511 are held between frame plates FP1 and FP2 that create structure for the sub-assembly and isolate its movement. The frame plates FP1 and FP2 allow the tilt blade axel 511 to rock vertically on pivot pin PV1 and PV2 hinges. The tilt blade axel is controlled on the blade side with a guide channel. This mechanical structure permits and controls the vertical movement of the tilt blade axel 511 when the suspension coil contracts and expands.

The guide channel structure CHI resists later torque "sway" of the tilt blade axel 511 at its lever end due to the leaning forces generated e.g., due to rocking or banking left or right during a high-speed turning. The caliper lock L1 is fixed to structure built on the tilt blade axel 511. In an embodiment, the caliper lock housing L1 has a slot S1 that lets a portion of the tilt blade 510 cleanly pass through the caliper pads, as shown in FIG. 5. In an embodiment, the caliper L1 is an electric caliper motor that actuates pads, gripping and releasing the tilt blade 510 to engage "lock" and disengage "unlock", thus controlling the lean of the vehicle. In an embodiment, the vehicle is a tricycle. When the lock is engages, the tricycle provides a tricycle like stable riding by locking the swing arms in a particular position. When unlocked, the tricycle provides a bicycle like riding by allowing swing arms to move up and down.

FIG. 6 illustrates a second tilt control system 600 including an electromagnetic lock coupled to a tilt blade axel 611 to control an amount of tilt of a tilt blade 610. As shown, the tilt blade 610 is coupled to the tie rod 520L on the left side, and a second tie rod 520R on the right side. The tie rods 520 are further coupled to the swing arms 240, for example, the tie rod 520L is coupled to the swing arm 240L, and the tie rod 520R is coupled to the swing arm 240R. As discussed earlier, the swing arms 240 are pivotably coupled to the frame at joint J1. In one embodiment, the tie rods 520 are coupled to the tilt blade 610 and the swing arms 240 by ball joints such as BJ1 and BJ2.

As mentioned earlier, the second tilt control system 600 also operates in several operating modes, for example, based on the speed of the vehicle. In the first mode, the electromagnetic lock L2 may lock the rotation of the tilt blade 610 about the tilt blade axel 611. In the second mode, the electromagnetic lock L2 may be configured to allow the tilt blade 610 to tilt by an amount of ±6° about the tilt blade axel 611. In the third mode, the electromagnetic lock L2 may be configured to allow the tilt blade 610 to tilt within an angle of +30° degrees about the tilt blade axel 611.

In FIG. 6, the electromagnetic lock is coupled to the tilt blade axel 611, which is further coupled to the frame plates FP1 and FP2 in a pivotable manner via pivot joint PV1. The pivot joint PV1 allows the axel 610 and the electromagnetic lock L2 to move vertically up and down. In one embodiment, the electromagnetic lock L2 may be further coupled to the suspension Coil SP1, as shown. In some embodiments, the suspension coil SP1 is pivotably coupled to the frame plates FP1 and FP2 at pivot joint PV2. Hence, the suspension coil SP1 provides a suspension effect to the movement of the electromagnetic lock and the tilt blade axel 611.

When the tilt blade axel 611 rotates the tilt blade 610, the rotation motion is transmitted via the tie rods 520 to move the swing arms 240 in a vertical direction. For example, when the tilt blade 610 rotates by a small amount in an anticlockwise direction, the tie rod 520L moves downward, causing the swing arm 240L to move downward. On the other side, the tilt blade 610 moves upward, causing the tie rod 520R to move upward, which pulls the swing arm 240R in an upward direction. Hence, the wheels W1 and W2 will be offset from each other when the tilt blade 610 rotates about the tilt blade axel 611. Similar action happens when the tilt blade 610 rotates in the opposite direction.

FIG. 7 illustrates a third tilt control system 700 configured to control the tilt of the tilt blade via a motor L3. In some embodiments, the motor L3 may be controlled via a processor. In some embodiments, the motor L3 may be directly coupled to the tilt blade axel 711. In some embodiments, the motor L3 may be coupled to the tilt blade axel 711 via a belt and pulley mechanism. Hence, the tilt blade axel 711 is further coupled to the tilt blade 710. Hence the amount of rotation of the tilt blade 710 is controlled by an amount of rotation of the motor L3. In one embodiment, the motor L3 may also be referred as a tilt control motor.

When the motor L3 rotates, the rotation of the motor shaft is transmitted to a pulley 701 connected to the motor. The rotation of the pulley 701 is further transmitted to a Second pulley 705 via a belt 703. In one embodiment, the pulley and the belt may be plain grooved or have tooth. The present disclosure is not limited to a particular type of belt drive mechanism.

In FIG. 7, the tilt blade axel 711 may be housed in the housing 712. The motor L3 may be physically attached to the housing 712. The housing 712 may be further pivotally coupled to the frame plates FP1 and FP2 via a PV joint PV1. Hence as the housing 712 moves up and down, the motor L3 also moves up and down without affecting the relative position of the motor with respect to the tilt blade axel 711. The tilt blade axel housing 712 may be further coupled to a suspension coil SP1, which is further coupled in a pivotable manner with the frame plates FP1 and FP2 via a pivot joint PV2. Hence, the movement of the housing 712 experiences a suspension action based on the expansion and contraction of the spring SP1.

The third tit control system also be controlled in at least three modes as discussed earlier. The three modes are not discussed further with respect to the third till control mechanism for brevity.

FIG. 8 illustrates a fourth tilt control system 800 comprising a motor and cord coupled with the tilt blade 810. The gear mechanism comprises a first gear 801 coupled to a motor shaft of the motor L4 and a second gear 811 meshing with the first gear 801. The second gear 811 is further coupled with tilt blade 810. In one embodiment, the second gear 811 may be partially formed as a part of the tilt blade 810. Hence, in one embodiment, the second gear 811 may be integral to the tilt blade 810. However, the present disclosure is not limited to a particular configuration of the gear system. For example, the second gear 811 may be separately configured and fixed or attached to the tilt blade 810 so that the rotation of the second gear 811 causes rotation of the tilt blade 810. Similar to the discussion with respect to FIG. 7, the tilt blade axel 811 may be housed in an axle housing 812 which is coupled to the frame in a favorable manner via a pivot joint PV1. Also, the motor L4 may be a fixture mounted to the housing 812. In some embodiments, the housing 812 may also be coupled to a suspension coil SP1 so that the housing 812 receives a suspension action from the suspension coil SP1 when the tilt blade axle housing 812 moves in an upward or downward direction.

In operation when the motor L4 rotates it causes rotation of the first gear 801 which is transmitted to the machine gear 811 which further causes rotation of the tilt blade 810. The control of the amount of tilt is similar to that discussed above. The fourth tilt control system 800 can also be operated in at least three modes as discussed above.

In each of the tilt control systems discussed about the tilt blade may be locked and unlocked depending on the mode of operation to provide a balance assist to the vehicle. In some embodiments, sensors may be provided to measure the position of the till blade and the swing arm. The position of the tool blade and/or the swingarm may be communicated to a controller or processor. In some embodiments, the processor also receives a speed of the vehicle. Based on the speed and the position information, the controller may control an amount of tilt of the tilt blade by sending a control signal to the motor electromagnetic lock. For example, the control signal may be an amount of rotation by the motor to either allow the rotation of the tilt blade within ±6° angle or within ±30° angle above the tilt blade axel. In one embodiment, the command may be to cease the rotation motion of the motor. In some embodiments, the controller may send the command to the electromagnetic lock that can lock or unlock the rotation of the axle based on the position and speed information.

Comparing the structures of the FIGS. 5-8, it can be understood that several mechanical structures their configuration are same. For example, common structures and connections include the tie rods 520, ball joints BJ1 and BJ2, frame plates FP1 and FP2, the suspension coil SP1, the pivot joints PV1 and PV2, and wheels W1 and W2.

An example of riding experience of a tricycle implementing the systems herein is discussed as follows. The ride may start when drive control is shifted from park mode into a drive mode. This action unlocks the wheel-hubs, activates the pedal throttle, and enables the tilt control system (e.g., 500, 600, 700, or 800).

When riding below a threshold speed (e.g., 3 mph) that demands concentrated rider attention to balance the vehicle, the tilt control system assumes control thereby balancing the vehicle. The tilt control system reads data from sensors to determine an optimal swing arm articulation that maintains vehicle balance. The system works with rider movements and the road surface, continuously adjusting the swing arms positions, to achieve a constant balance as the rider adjust his/her weight and the vehicle moves over uneven terrain.

When the sensors detect the vehicle exceeding the threshold speed (e.g., 3 mph) barrier, the trike-like performance may become unsafe when maneuvering. The tilt control system relaxes, allowing riders to lean into turns without balance assistance or resistance.

As vehicle speeds drop back below the threshold speed (e.g., 3 mph), the tilt control system automatically reengages lean control, again providing vehicle stability.

At the end of the ride, shifting the tilt control system from the drive mode back into the park mode mechanically locks the tilt control system and wheel motor hubs, ensuring reliable vehicle stability for loading, unloading, and long-term storage. Sensors in the tilt control system enable the swing arms to lock at any angle as long as the vehicle platform is plum to gravity. This function allows the vehicle to securely park on uneven surfaces.

Figure 10:
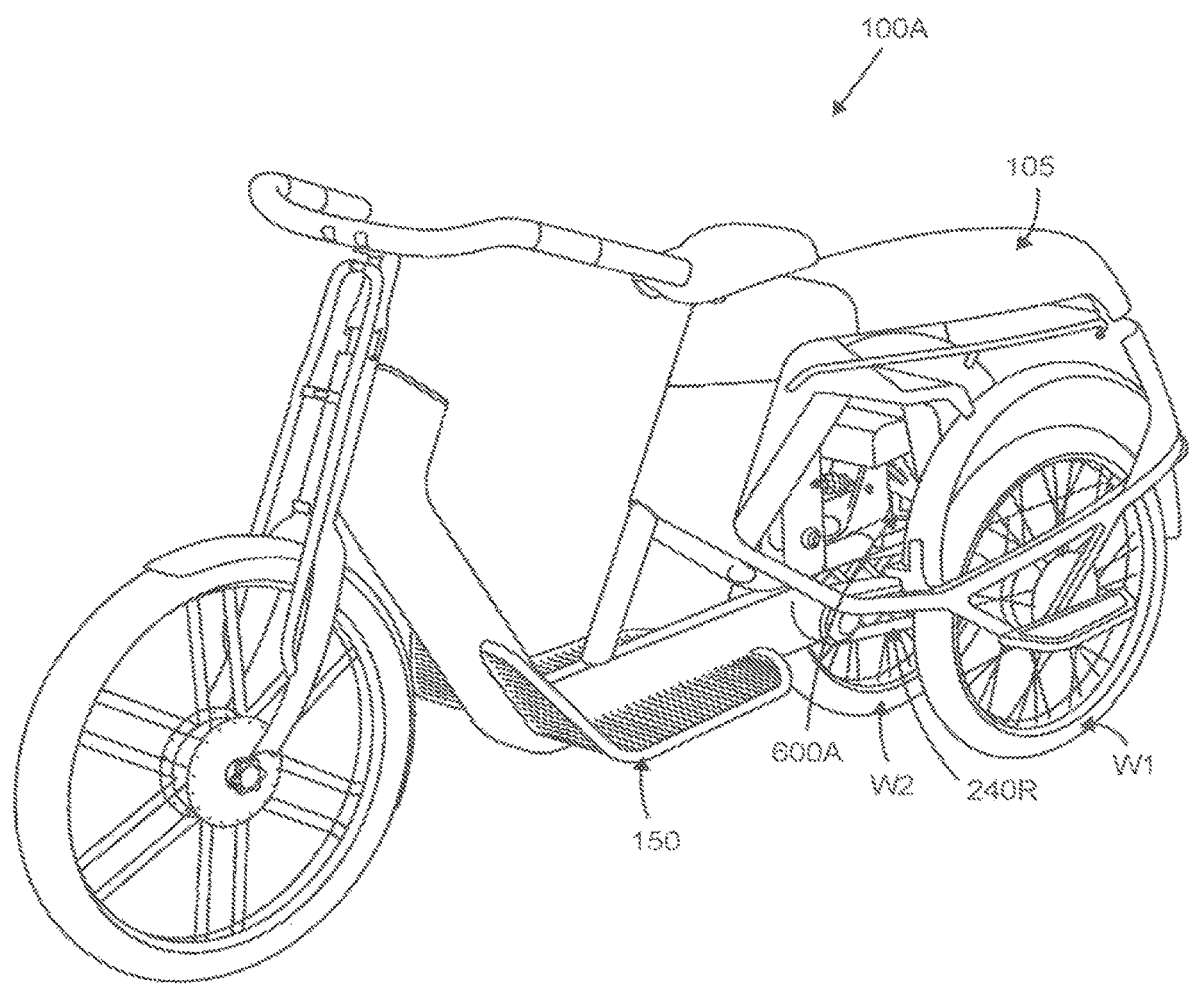
FIG. 10 illustrates an electric bike configured to include swing arms and tilt control mechanism, according to an embodiment.
Figure 11:
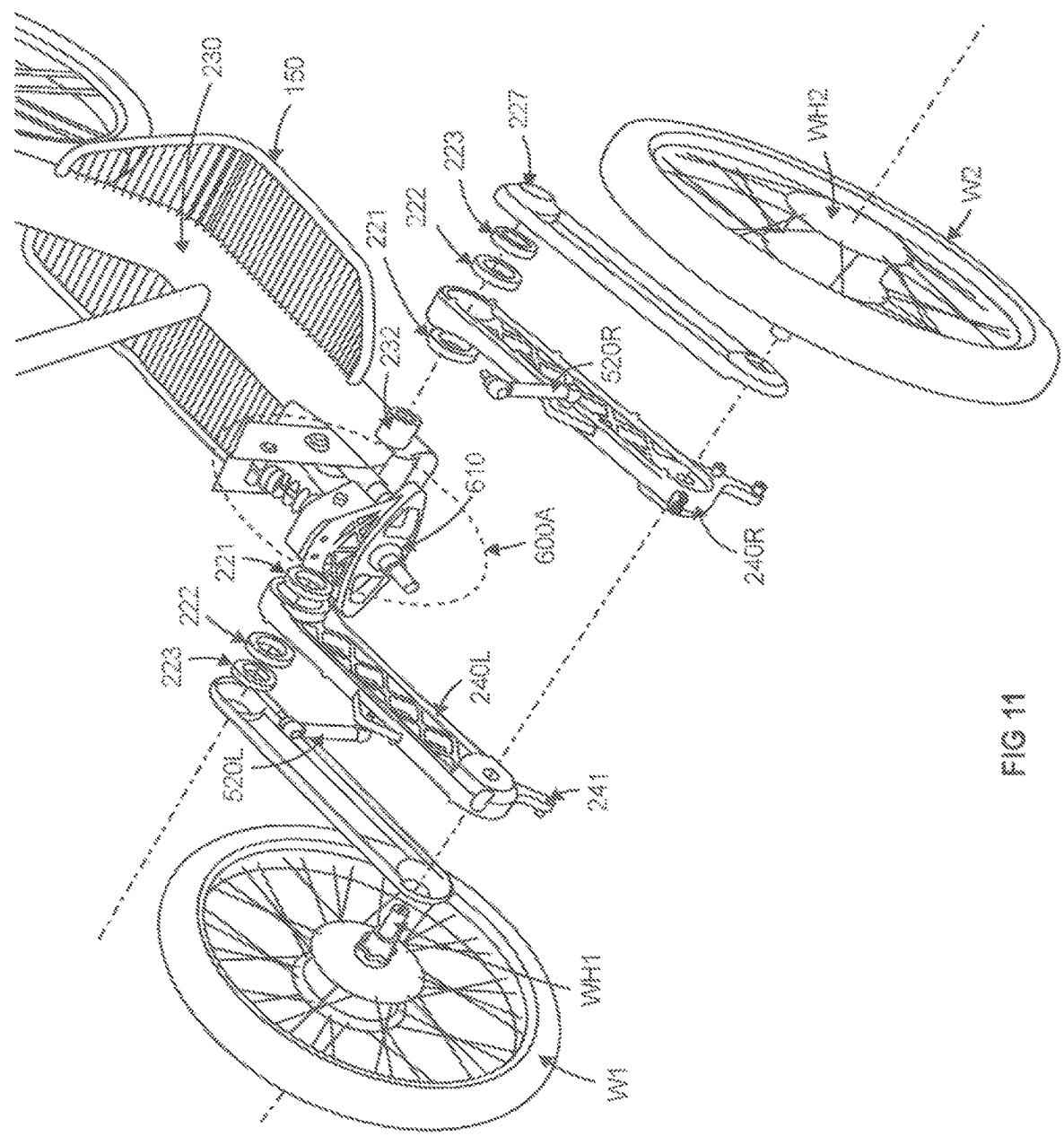
FIG. 11 illustrates an exploded view of assembly of swing arms to the electric bike of FIG. 10, according to an embodiment.
Figure 12:
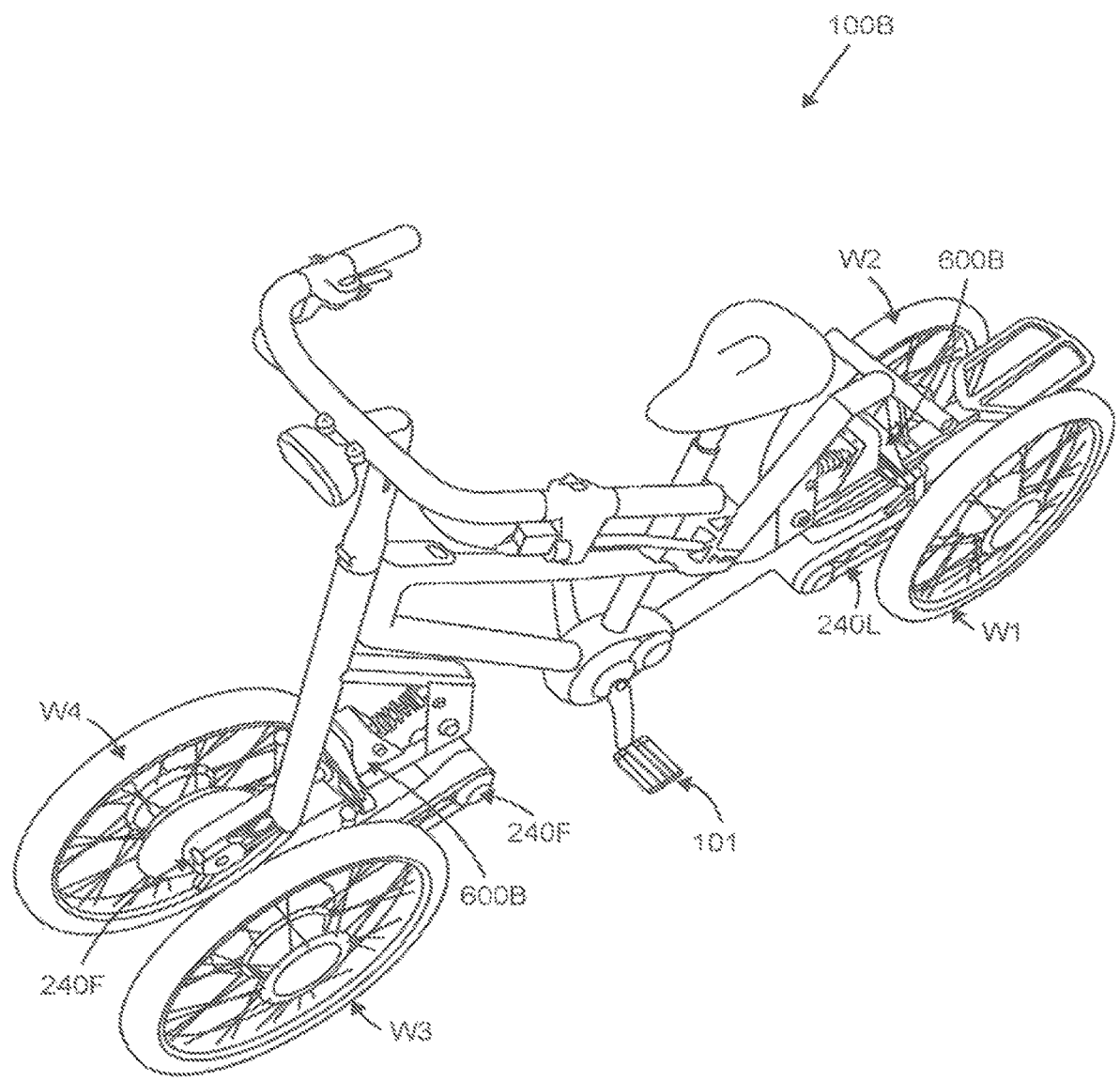
FIG. 12 illustrates a vehicle with four wheels comprising swing arms coupled to front wheels and rear wheels, and tilt control mechanism, according to an embodiment.

In an embodiment, the systems discussed herein may be implemented in different types of vehicles, such as electric bikes (e-bikes with no pedal), a vehicle with four wheels, etc. FIG. 10 illustrates an ebike configured to include the systems discussed herein. For example, FIG. 11 illustrates a drivetrain including swing arm 240 and a tilt control system 600B (e.g., same as 600 of FIG. 6 or other mechanisms similar to FIGS. 5-8). FIG. 12 illustrates a four wheeled vehicle configured to include the drivetrain (e.g., of FIG. 11) and the assist mechanism (e.g., similar to FIGS. 5-8) coupled to front wheels, the rear wheels, or both front wheels and rear wheels.

FIG. 10 illustrates the ebike 100A, which is similar to the bike 100 except for the pedal 101. In an embodiment, the ebike 100A may be driven only by motors installed in the wheel hubs of the wheels W1 and W2. In an embodiment, the wheels W1 and W2 of the ebike 100A are coupled to the swing arms 240, respectively. The operation of the ebike 100A is similar to that of the bike 100 (except for discussion with respect to the pedal 100) and is omitted for brevity. In an example configuration, the ebike 100A may include a foot platform 150 instead of a pedal.

In an embodiment, example configuration of the swing arm 240 is discussed with respect to FIG. 11. The swing arm 240 is coupled to a frame of the ebike 100A in a similar manner as discussed with respect to FIG. 3. In an embodiment, the swing arm 240 is coupled to mounting portions 232 of the frame 230. For example, as discussed earlier, the swing arm 240 is coupled via the bearings 221 and 222 at a first end (front end) and the wheel W1 at a second end (rear end). In an embodiment, the bearing 222 may be locked in place by a lock nut 223. In an embodiment, the swing arm 240 may be configured to include brake caliper 241. In this example, as pedal is not included, as such an axel, drive shaft, cogs, and belt drive can be omitted.

In an embodiment, the ebike 100A is configured to include a tilt control system 600A including a tilt blade controlled by a tilt control system (e.g., as discussed with respect to FIGS. 5-8). For example, the balance assist system includes the tilt blade 610 mounted on the tilt blade axel 611. An amount of tilt of the tilt blade is controlled by the tilt control system discussed herein. The tilt blade 610 may be coupled to tie rods 520, which is further coupled to the swing arm 240 to control an amount of up or down movement of the corresponding wheel W1 (or W2). In an embodiment, the swing arm 240 includes a connecting portion configured to couple the tie rod 520. In an embodiment, the operation of the tilt control system 600A is similar to that discussed with respect to FIGS. 5-8 and omitted here for brevity.

FIG. 12 illustrates the exemplary bike 100B having four wheels. In an embodiment, each of the wheels W1, W2, W3, and W4 may be coupled to a swing arm 240. For example, from wheels W3 and W4 are each coupled to a swing arm 240F (same as the swing arm 240). The front swing arms 240F allows the wheels W3 and W4 to move in upward or downward direction with respect to each other. In other words, the movements of the wheels W3 and W4 is similar to that of wheels W1 and W2, as discussed above with respect to vehicle 100.

In an embodiment, the operations discussed herein may be provided as one or more computer program products or a non-transitory computer readable medium having instructions recorded thereon, the instructions when executed by a processor implements the operations discussed herein. For example, in FIG. 13 a non-transitory computer-readable media (e.g., memory) comprising instructions that, when executed by one or more processors (e.g., PRO), cause operations for adjusting the tilt of a tilt blade of a tilt control system discussed herein.

FIG. 13 illustrates an example tilt control system TCS that includes a controller CS configured to control tilting means TM (e.g., a motor, electro-magnetic lock, etc.). Various embodiments of the tilting means are discussed with respect to FIGS. 5 through 8. In FIG. 13, the controller CS includes a bus BS or other communication mechanism for communicating information, and a processor PRO (or multiple processor) coupled with bus BS for processing information. The controller CS also include a main memory MM, such as a random access memory (RAM) or other dynamic storage device, coupled to bus BS for storing information and instructions to be executed by processor PRO. Main memory MM also may be used for storing temporary variables or other intermediate information during execution of instructions to be executed by processor PRO. The controller CS may further include a read only memory (ROM) ROM or other static storage device coupled to bus BS for storing static information and instructions for processor PRO. A storage device SD, such as a magnetic disk or optical disk, is provided and coupled to bus BS for storing information and instructions.

The controller CS may be coupled via bus BS to one or more sensors DS, such as a position sensor, a weight sensor, a speed sensor, a gyroscope, etc. to capture information for determining an amount of tilt of the vehicle thereby providing balance assistance. A tilting means TM, such as a motor, electro-magnetic lock, etc. is coupled to bus BS for communicating information and receiving command from the processor PRO.

According to one embodiment, portions of one or more operations described herein may be performed by the controller CS in response to processor PRO executing one or more sequences of one or more instructions contained in main memory MM. Such instructions may be read into main memory MM from another computer-readable medium, such as storage device SD. Execution of the sequences of instructions contained in main memory MM causes processor PRO to perform the process steps described herein. One or more processors in a multi-processing arrangement may also be employed to execute the sequences of instructions contained in main memory MM. In an alternative embodiment, hard-wired circuitry may be used in place of or in combination with software instructions. Thus, the description herein is not limited to any specific combination of hardware circuitry and software.

The term "computer-readable medium" as used herein refers to any medium that participates in providing instructions to processor PRO for execution. Such a medium may take many forms, including but not limited to, non-volatile media, volatile media, and transmission media. Non-volatile media include, for example, optical or magnetic disks, such as storage device SD. Volatile media include dynamic memory, such as main memory MM. Transmission media include coaxial cables, copper wire and fiber optics, including the wires that comprise bus BS. Transmission media can also take the form of acoustic or light waves, such as those generated during radio frequency (RF) and infrared (IR) data communications. Computer-readable media can be non-transitory, for example, a solid-state disk, a hard disk, magnetic tape, any other magnetic medium, a RAM, a PROM, and EPROM, a FLASH-EPROM, any other memory chip or cartridge. Non-transitory computer readable media can have instructions recorded thereon. The instructions, when executed by a computer, can implement any of the features described herein. Transitory computer-readable media can include a carrier wave or other propagating electromagnetic signal.

Various forms of computer readable media may be involved in carrying one or more sequences of one or more instructions to processor PRO for execution. For example, the instructions may initially be borne on a magnetic disk of a remote computer. The remote computer can load the instructions into its dynamic memory and send the instructions over a telephone line using a modem. A modem local to the controller CS can receive the data on the telephone line and use an infrared transmitter to convert the data to an infrared signal. An infrared detector coupled to bus BS can receive the data carried in the infrared signal and place the data on bus BS. Bus BS carries the data to main memory MM, from which processor PRO retrieves and executes the instructions. The instructions received by main memory MM may optionally be stored on storage device SD either before or after execution by processor PRO.

The controller CS may also include a communication interface CI coupled to bus BS. Communication interface CI provides a two-way data communication coupling to a network link NDL that is connected to a local network LAN. For example, communication interface CI may be an integrated services digital network (ISDN) card or a modem to provide a data communication connection to a corresponding type of telephone line. As another example, communication interface CI may be a local area network (LAN) card to provide a data communication connection to a compatible LAN. Wireless links may also be implemented. In any such implementation, communication interface CI sends and receives electrical, electromagnetic or optical signals that carry digital data streams representing various types of information.

The controller CS can send messages and receive data, including program code, through the network(s), network data link NDL, and communication interface CL In the Internet example, host computer HC might transmit a requested code for an application program through Internet INT, network data link NDL, local network LAN and communication interface CL One such downloaded application may provide all, or part of a method described herein, for example. The received code may be executed by processor PRO as it is received, and/or stored in storage device SD, or other non-volatile storage for later execution. In this manner, computer system CS may obtain application code in the form of a carrier wave.

In the following, further features, characteristics, and exemplary technical solutions of the present disclosure will be described in terms of items that may be optionally claimed in any combination:

Item 1: A electric vehicle including a frame portion having a first side and a second side; a first rear wheel disposed rearward relative to the frame portion at the first side; a second rear wheel disposed rearward relative to the frame portion at the second side, the second rear wheel being spaced from the first rear wheel with a wheel base width therebetween being in a range from 260 mm to 900 mm; a first swing arm extending between the frame portion and the first rear wheel, the first swing arm pivotably coupled to the frame portion at the first side and operably coupled to the first rear wheel; and a second swing arm extending between the frame portion and the second rear wheel, the second swing arm pivotably coupled to the frame portion at the second side and operably coupled to the second rear wheel.

Item 2: The electric vehicle of Item 1, where the first swing arm wherein the first swing arm and the second swing arm each having a length in a range from 250 mm to 600 mm.

Item 3: The electric vehicle of any one of the preceding Items, where the first swing arm is configured to move the first rear wheel independently of the second rear wheel, and the second swing arm is configured to move the second rear wheel independently of the first rear wheel.

Item 4: The electric vehicle of any one of the preceding Items, where the first swing arm has an elongated shape with a first end and a second end, the first swing arm pivotably coupled to the frame portion at the first end and operably coupled to the first rear wheel at the second end, the first swing arm being articulated to cause the first rear wheel to move independently of the second rear wheel; and the second swing arm has an elongated shape with a first end and a second end, the second swing arm pivotably coupled to the frame portion at the first end and operably coupled to the second rear wheel at the second end, the second swing arm being articulated to cause the second rear wheel to move independently of the first rear wheel.

Item 5: The electric vehicle of any one of the preceding Items, where the first swing arm includes a first cog; a first bearing; and a second bearing disposed at the first end, the first cog, the first bearing, and the second bearing being axial aligned; a second cog disposed at the second end; and a drive belt extending between the first cog and the second cog and configured to transmit rotation between the first cog and the second cog.

Item 6: The electric vehicle of any one of the preceding Items, further including a drive belt tensioner configured to apply tension to the drive belt to securely fasten the first rear wheel to the first swing arm, and release tension on the drive belt to enable removal of the first rear wheel from the first swing arm.

Item 7: The electric vehicle of any one of the preceding Items, where the first cog of the first swing arm is a freewheel configured to maintain the drive belt stationary while allowing the first rear wheel rotate freely in absence of input from a pedal.

Item 8: The electric vehicle of any one of the preceding Items, further includes: an axel having a first end and a second end and extending between the first swing arm and the second swing arm, the axel being configured to support the first swing arm at the first end, and the second swing arm at the second end, the longitudinal axis of the axel being parallel to an axis of rotation of the first rear wheel and the second rear wheel.

Item 9: The electric vehicle of any one of the preceding Items, where the axel includes: a bevel gear mounted at a center of the axel and configured to receive a rotation motion about a first axis of rotation, which intersects with the longitudinal axis of the axel, and convert the rotation motion to a rotation of the axel about the longitudinal axis, wherein the axel rotation is transmitted by the first swing arm and the second swing arm to the first rear wheel and the second rear wheel, respectively.

Item 10: The electric vehicle of any one of the preceding Items, further includes a pinion gear meshing with the bevel gear, the pinion gear configured to rotate about the first axis of rotation.

Item 11: The electric vehicle of any one of the preceding Items, where the pinion gear is mounted on a shaft extending along the first axis of rotation, the shaft coupled to a pedal to receive rotational input.

Item 12: The electric vehicle of any one of the preceding Items, where the frame portion includes a first hollow element extending parallel to an axis of rotation of the first rear wheel, and configured to pivotably support the first swing arm at one end and the second swing arm at an opposite end.

Item 13: The electric vehicle of any one of the preceding Items, where the first bearing of the first swing arm is mounted at the one end of the first hollow element, and the first bearing of the second swing arm is mounted at the opposite end of the first hollow element.

Item 14: The electric vehicle of any one of the preceding Items, where the frame portion further includes a second hollow element intersecting the first hollow element at an angle and extending away from the rear wheels.

Item 15: The electric vehicle of any one of the preceding Items, where the first hollow element is configured to receive the axel inside a hollow portion, and the second hollow element is configured to receive the pinion gear.

Item 16: The electric vehicle of any one of the preceding Items, further includes: a pedal configured to drive the first and the second rear wheels via the first swing arm and the second swing arm respectively.

Item 17: The electric vehicle of any one of the preceding Items, further includes a gear system coupled to the pedal, the gear system transmitting a pedal rotation to a pinion gear configured to drive the first and the second rear wheels via the first swing arm and the second swing arm, respectively.

Item 18: The electric vehicle of any one of the preceding Items, further includes a first motor housed within a hub of the first rear wheel, the first motor configured to control the first rear wheel within a desired speed range; and a second motor housed within a hub of the second rear wheel, the second motor configured to control the second rear wheel within the desired speed range.

Item 19: An electric vehicle including a frame portion having a first side and a second side; a first rear wheel disposed rearward relative to the frame portion at the first side; a second rear wheel disposed rearward relative to the frame portion at the second side; a first swing arm having an elongated shape with a first end and a second end, wherein the first end of the first swing arm is pivotably coupled to the first side of the frame portion, and the second end of the first swing arm is operably coupled to the first rear wheel, the first swing arm being articulated to cause the first rear wheel to move independently of the second rear wheel; and a second swing arm having an elongated shape with a first end and a second end, wherein the first end of the second swing arm is pivotably coupled to the first side of the frame portion and the second end of the second swing arm is operably coupled to the second rear wheel, the second swing arm being articulated to cause the second rear wheel to move independently of the first rear wheel.

Item 20: The electric vehicle of Item 19, further includes a drivetrain includes an axel having a first end and a second end and extending between the first swing arm and the second swing arm; a first drive mechanism housed by the first swing arm and configured to transmit motion between the axel and the first rear wheel; and a second drive mechanism housed by the second swing arm and configured to transmit motion between the axel and the second rear wheel.

Item 21: The electric vehicle of any one of Items 19-20, where the first mechanism includes a first cog disposed at the first end of the first swing arm; a first bearing disposed adjacent to the first cog; a second bearing disposed adjacent to the first bearing and coupled to the frame portion, the first cog, the first bearing, and the second bearing being axial aligned and mounted on the axel at the first end of the axel; a second cog disposed at the second end of the first swing arm; and a drive belt extending between the first cog and the second cog. The first mechanism transmits rotation motion of the axel to the first cog, the drive belt transmits the rotation of the first cog to the second cog, and the second cog transmits the rotation to the first rear wheel.

Item 22: The electric vehicle of any one of Items 19-21, where the second mechanism includes a third cog disposed at the first end of the second swing arm; a third bearing disposed adjacent to the third cog; a fourth bearing disposed adjacent to the third bearing and coupled to the frame portion, the third cog, the third bearing, and the fourth bearing being axial aligned and mounted on the axel at the second end of the axel; a fourth cog disposed at the second end of the second swing arm; and a drive belt extending between the third cog and the fourth cog. The second mechanism transmits rotation motion of the axel to the third cog, the drive belt transmits the rotation of the third cog to the fourth cog, and the fourth cog transmits the rotation to the second rear wheel.

Item 23: The electric vehicle of any one of Items 19-22, where the axel supports and freely rotates with respect to the first swing arm at the first end and the second swing arm at the second end, the longitudinal axis of the axel being parallel to an axis of rotation of the first rear wheel and the second rear wheel.

Item 24: The electric vehicle of any one of Items 19-23, where the axel includes a bevel gear mounted at a center of the axel and configured to receive a rotation motion about a first axis of rotation, which intersects with the longitudinal axis of the axel, and convert the rotation motion to a rotation of the axel about the longitudinal axis.

Item 25: The electric vehicle of any one of the preceding Items, further includes a pinion gear meshing with the bevel gear, the pinion gear configured to rotate about the first axis of rotation.

Item 26: The electric vehicle of any one of Items 19-25, where the first rear wheel and the second rear wheel are powered manually by a pedal disposed at the frame portion, or automatically by a first motor and a second motor connected to the first rear wheel and the second rear wheel, respectively.

Item 27: An electric vehicle includes a frame portion having a first side and a second side with a channel therebetween; a first rear wheel disposed rearward relative to the frame portion at the first side; a second rear wheel disposed rearward relative to the frame portion at the second side; a tilt control motor coupled to the channel of the frame portion; and a tilt blade having a first end and a second end, and extending along a longitudinal axis perpendicular to axis of rotation of the tilt control motor, the tilt blade being coupled to the tilt control motor, the tilt control motor controlling an amount of tilt of the tilt blade in an up direction or a down direction. The first end of the tilt blade is operably coupled to the first rear wheel, and the second end of the tilt blade is operably coupled to the second rear wheel. The first rear wheel and the second rear wheel is configured to move in the up direction or the down direction based on the amount of tilt.

Item 28: The electric vehicle of Item 27, further includes a first tie rod connected to the first end of the tilt blade to transmit tilting motion to the first rear wheel; and a second tie rod connected to the second end of the tilt blade to transmit tilting motion to the second rear wheel.

Item 29: The electric vehicle of any one of Items 27-28, further includes the frame portion having a first mounting portion a first side and a second mounting portion at a second side, which is opposite of the first side; a first swing arm extending between the first mounting portion and the first rear wheel, the first swing arm being pivotably coupled to the first mounting portion and operably coupled to the first rear wheel; and a second swing arm extending between the second mounting portion and the second rear wheel, the second swing arm being pivotably coupled to the second mounting portion and operably coupled to the second rear wheel.

Item 30: The electric vehicle of any one of Items 27-29, where the first tie rod is connected to the first end of the tilt blade, and connected to the first swing arm; and the second tie rod is connected to the second end of the tilt blade, and connected to the second swing arm.

Item 31: The electric vehicle of any one of Items 27-30, where joints of the tie rod includes ball joints.

Item 32: The electric vehicle of any one of Items 27-31, where the tilt control motor is configured to control the tilt blade in at least three modes based on a speed of the electric vehicle or a mode selected by a rider.

Item 33: The electric vehicle of any one of Items 27-32, where, in a first mode of the at least three modes, the tilt control motor is configured to lock the tilt blade at a particular angle about a pivot point between the tilt control motor and the tilt blade when the speed of the electric vehicle is less than a speed threshold.

Item 34: The electric vehicle of any one of Items 27-33, where the tilt control motor is configured to lock the tilt blade at the particular angle corresponding to banking of a road surface.

Item 35: The electric vehicle of any one of Items 27-34, where, in a second mode of the at least three modes, the tilt control motor is configured to unlock the tilt blade and control the amount of tilt within a 6° range about a pivot point between the tilt control motor and the tilt blade, the amount of tilt balancing a shift in load when the speed of the vehicle is less than a speed threshold.

Item 36: The electric vehicle of any one of Items 27-35, where, in a third mode of the at least three modes, the tilt control motor is configured to unlock the tilt blade and control the amount of tilt within a 30° range about a pivot point between the tilt control motor and the tilt blade when the speed of the vehicle is greater than a speed threshold. The control of the tilt blade causes the first rear wheel and the second rear wheel to offset form each other in the up direction or the down direction during a turn.

Item 37: The electric vehicle of any one of Items 27-36, where the tilt control motor is directly connected to the tilt blade at a center of the tilt blade.

Item 38: The electric vehicle of any one of Items 27-37, wherein the tilt control motor is coupled to the tilt blade via a gear and pulley mechanism.

Item 39: The electric vehicle of any one of Items 27-38, where the tilt control motor is coupled to the tilt blade via a gear mechanism.

Item 40: The electric vehicle of any one of Items 27-39, where the tilt control motor is pivotably connected to the channel of the frame portion such that the tilt control motor moves in the up direction or the down direction, the channel preventing the tilt control motor from moving in a horizontal direction.

Item 41: An electric vehicle includes: a frame portion having a first side and a second side with a channel therebetween; a first rear wheel disposed rearward relative to the frame portion at the first side; a second rear wheel disposed rearward relative to the frame portion at the second side; a tilt control motor coupled to the channel of the frame portion; and a tilt blade having a first end and a second end, and extending along a longitudinal axis perpendicular to axis of rotation of the tilt control motor. The tilt control motor locks the tilt blade at a particular angle about a pivot point between the tilt control motor and the tilt blade when the speed of the electric vehicle is less than a speed threshold. The first end of the tilt blade is operably coupled to the first rear wheel, and the second end of the tilt blade is operably coupled to the second rear wheel. The first rear wheel and the second rear wheel is configured to move in an up direction or a down direction based on the amount of tilt.

Item 42: An electric vehicle includes a frame portion having a first side and a second side with a channel therebetween; a first rear wheel disposed rearward relative to the frame portion at the first side; a second rear wheel disposed rearward relative to the frame portion at the second side; a tilt control motor coupled to the channel of the frame portion; and a tilt blade having a first end and a second end, and extending along a longitudinal axis perpendicular to axis of rotation of the tilt control motor. The tilt control motor is configured to control an amount of tilt of the tilt blade within a 6° range about a pivot point between the tilt control motor and the tilt blade, the amount of tilt balancing a shift in load when a speed of the vehicle is less than a speed threshold. The first end of the tilt blade is operably coupled to the first rear wheel, and the second end of the tilt blade is operably coupled to the second rear wheel. The first rear wheel and the second rear wheel is configured to move in an up direction or a down direction based on the amount of tilt.

Item 43: An electric vehicle includes a frame portion having a first side and a second side with a channel therebetween; a first rear wheel disposed rearward relative to the frame portion at the first side; a second rear wheel disposed rearward relative to the frame portion at the second side; a tilt control motor coupled to the channel of the frame portion; and a tilt blade having a first end and a second end, and extending along a longitudinal axis perpendicular to axis of rotation of the tilt control motor. The tilt control motor is configured to control an amount of tilt within a 30° range about a pivot point between the tilt control motor and the tilt blade when a speed of the vehicle is greater than a speed threshold, during turning of the vehicle. The first end of the tilt blade is operably coupled to the first rear wheel, and the second end of the tilt blade is operably coupled to the second rear wheel. The first rear wheel and the second rear wheel is configured to move in the up direction or the down direction based on the amount of tilt.

The present disclosure contemplates that the calculations disclosed in the embodiments herein may be performed in a number of ways, applying the same concepts taught herein, and that such calculations are equivalent to the embodiments disclosed.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, computer programs and/or articles depending on the desired configuration. Any methods or the logic flows depicted in the accompanying figures and/or described herein do not necessarily require the particular order shown, or sequential order, to achieve desirable results. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. The implementations described above can be directed to various combinations and sub combinations of the disclosed features and/or combinations and sub combinations of further features noted above. Furthermore, above described advantages are not intended to limit the application of any issued claims to processes and structures accomplishing any or all of the advantages.

Although the present disclosure has been described in detail for the purpose of illustration, it is to be understood that such detail is solely for that purpose and that the present disclosure is not limited to the disclosed embodiments, but, on the contrary, is intended to cover modifications and equivalent arrangements that are within the spirit and scope of the appended claims. In addition, it is to be understood that the present patent application contemplates that, to the extent possible, one or more features of any embodiment can be combined with one or more features of any other embodiment.

What is claimed is:

1. An electric vehicle comprising:
a frame portion having a first side and a second side with a channel therebetween; a first rear wheel disposed rearward relative to the frame portion at the first side;
a second rear wheel disposed rearward relative to the frame portion at the second side;
a tilt control motor coupled to the channel of the frame portion; and
a tilt blade having a first end and a second end, and extending along a longitudinal axis perpendicular to axis of rotation of the tilt control motor, the tilt blade being coupled to the tilt control motor, the tilt control motor controlling an amount of tilt of the tilt blade in an up direction or a down direction;
wherein the first end of the tilt blade is operably coupled to the first rear wheel, and the second end of the tilt blade is operably coupled to the second rear wheel,
wherein the first rear wheel and the second rear wheel is configured to move in the up direction or the down direction based on the amount of tilt, and
wherein the tilt control motor is configured to control the tilt blade in at least three modes based on a speed of the electric vehicle or a mode selected by a rider.

2. The electric vehicle of claim 1, further comprising:
a first tie rod connected to the first end of the tilt blade to transmit tilting motion to the first rear wheel; and
a second tie rod connected to the second end of the tilt blade to transmit tilting motion to the second rear wheel.

3. The electric vehicle of claim 2, further comprising:
the frame portion having a first mounting portion at a first side and a second mounting portion at a second side, which is opposite of the first side;
a first swing arm extending between the first mounting portion and the first rear wheel, the first swing arm being pivotably coupled to the first mounting portion and operably coupled to the first rear wheel; and
a second swing arm extending between the second mounting portion and the second rear wheel, the second swing arm being pivotably coupled to the second mounting portion and operably coupled to the second rear wheel.

4. The electric vehicle of claim 3, wherein:
the first tie rod is connected to the first end of the tilt blade, and connected to the first swing arm; and
the second tie rod is connected to the second end of the tilt blade, and connected to the second swing arm.

5. The electric vehicle of claim 4, wherein joints of the tie rod includes ball joints.

6. The electric vehicle of claim 1, wherein, in a first mode of the at least three modes, the tilt control motor is configured to lock the tilt blade at a particular angle about a pivot point between the tilt control motor and the tilt blade when the speed of the electric vehicle is less than a speed threshold.

7. The electric vehicle of claim 6, wherein, the tilt control motor is configured to lock the tilt blade at the particular angle corresponding to banking of a road surface.

8. The electric vehicle of claim 1, wherein, in a second mode of the at least three modes, the tilt control motor is configured to unlock the tilt blade and control the amount of tilt within a 6° range about a pivot point between the tilt control motor and the tilt blade, the amount of tilt balancing a shift in load when the speed of the vehicle is less than a speed threshold.

9. The electric vehicle of claim 1, wherein, in a third mode of the at least three modes, the tilt control motor is configured to unlock the tilt blade and control the amount of tilt within a 30° range about a pivot point between the tilt control motor and the tilt blade when the speed of the vehicle is greater than a speed threshold,
wherein the control of the tilt blade causes the first rear wheel and the second rear wheel to offset from each other in the up direction or the down direction during a turn.

10. The electric vehicle of claim 1, wherein the tilt control motor is directly connected to the tilt blade at a center of the tilt blade.

11. The electric vehicle of claim 1, wherein the tilt control motor is coupled to the tilt blade via a gear and pulley mechanism.

12. The electric vehicle of claim 1, wherein the tilt control motor is coupled to the tilt blade via a gear mechanism.

13. The electric vehicle of claim 1, wherein the tilt control motor is pivotably connected to the channel of the frame portion such that the tilt control motor moves in the up direction or the down direction, the channel preventing the tilt control motor from moving in a horizontal direction.

* * * * *